US009951708B2

(12) United States Patent
Nakada

(10) Patent No.: US 9,951,708 B2
(45) Date of Patent: Apr. 24, 2018

(54) CONTROL APPARATUS FOR INTERNAL COMBUSTION ENGINE

(75) Inventor: Hayato Nakada, Yamanashi-ken (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 951 days.

(21) Appl. No.: 14/348,783

(22) PCT Filed: Oct. 6, 2011

(86) PCT No.: PCT/JP2011/073108
§ 371 (c)(1), (2), (4) Date: Mar. 31, 2014

(87) PCT Pub. No.: WO2013/051134
PCT Pub. Date: Apr. 11, 2013

(65) Prior Publication Data
US 2014/0236456 A1 Aug. 21, 2014

(51) Int. Cl.
*F02D 23/00* (2006.01)
*F02D 41/30* (2006.01)
(Continued)

(52) U.S. Cl.
CPC ............ *F02D 41/30* (2013.01); *F02D 21/08* (2013.01); *F02D 23/00* (2013.01);
(Continued)

(58) Field of Classification Search
CPC .. F02D 41/30; F02D 41/0072; F02D 41/1401; F02D 41/045; F02D 41/0007;
(Continued)

(56) References Cited

U.S. PATENT DOCUMENTS

2003/0145591 A1 8/2003 Arnold
2003/0149522 A1 8/2003 Arnold

FOREIGN PATENT DOCUMENTS

JP 02-176114 A 7/1990
JP 2001-107737 A 4/2001
(Continued)

OTHER PUBLICATIONS

Partial translation of Written Opinion for PCT/JP2011/073108 of the International Searching Authority dated Dec. 27, 2011.
(Continued)

*Primary Examiner* — Laert Dounis
*Assistant Examiner* — Kelsey Stanek
(74) *Attorney, Agent, or Firm* — Sughrue Mion, PLLC

(57) ABSTRACT

The invention relates to a control apparatus for an internal combustion engine (10) including a control target (60V, 52) that controls controlled variable (Pim, Regr). The control apparatus according to the invention is capable of selectively performing single control that is control for controlling the controlled variable to a target value thereof (Pimt, Regrt) without considering a change in the controlled variable that acts as a disturbance on the control of the controlled variable, and composite control that is control for controlling the controlled variable to the target value thereof in consideration of the change in the controlled variable that acts as the disturbance on the control of the controlled variable. The controlled variable is controlled to the target value thereof through the single control when an absolute value of a controlled variable change rate (Rpim, Rregr) is equal to or smaller than a predetermined value (Rpimth, Rregrth). The controlled variable is controlled to the target value thereof through the composite control when the absolute value of the controlled variable change rate is larger than the predetermined value.

10 Claims, 19 Drawing Sheets

10 20 22 40 76 21 42 23 30 37 41 60T 31 72 60 60C 33 34 32 36 35 80 CPU 81 ROM 82 INTERFACE RAM 83 Back up RAM 84 70 71 85

(51) Int. Cl.
*F02D 41/00* (2006.01)
*F02D 41/14* (2006.01)
*F02D 21/08* (2006.01)
*F02D 41/04* (2006.01)

(52) U.S. Cl.
CPC ..... *F02D 41/0007* (2013.01); *F02D 41/0072* (2013.01); *F02D 41/045* (2013.01); *F02D 41/1401* (2013.01); *F02D 2041/141* (2013.01); *Y02T 10/144* (2013.01); *Y02T 10/47* (2013.01)

(58) Field of Classification Search
CPC ........ F02D 21/08; F02D 23/00; Y02T 10/144; Y02T 10/47
USPC .......... 60/602, 601, 603; 701/102, 103, 104, 701/108
See application file for complete search history.

(56) References Cited

FOREIGN PATENT DOCUMENTS

| | | |
|---|---|---|
| JP | 2007-127001 A | 5/2007 |
| JP | 2009-092055 A | 4/2009 |

OTHER PUBLICATIONS

International Search Report for PCT/JP2011/073108 dated Dec. 27, 2011.
Robert Beckmann et al., "Modeling and Exact Feed Forward Control of Air and Burned Gas Fraction within SI Engine Cylinders", Aug. 22, 2011, pp. 316-321, XP031968305 (6 pages total).
Andrea Emilio Catania et al., "Predictive zero-dimensional combustion model for DI diesel engine feed-forward control", Energy Conversion and Management, vol. 52, No. 10, May 1, 2011, pp. 3159-3175, XP028237485(17 pages total).

(A)

(B)

(C)

(A)

(B)

CONTROL APPARATUS FOR INTERNAL COMBUSTION ENGINE

TECHNICAL FIELD

The invention relates to a control apparatus for an internal combustion engine.

BACKGROUND ART

A boost pressure control system for an internal combustion engine is described in Patent Document 1. According to this boost pressure control system, in the case where a boost pressure needs to be raised to be made coincident with a target boost pressure as a target value thereof, the boost pressure is controlled through open-loop control while a difference between the boost pressure and the target boost pressure (this difference will be referred to hereinafter as "a boost pressure deviation") is equal to or larger than a predetermined value, and the boost pressure is controlled through feedback control if the boost pressure deviation becomes smaller than the predetermined value. It should be noted herein that in the case where a rate of rise in the boost pressure in the control of the boost pressure through open-loop control (this control will be referred to hereinafter as "boost pressure OL control") prior to the start of the control of the boost pressure through feedback control (this control will be referred to hereinafter as "boost pressure FB control") is relatively large, the rate of rise in the boost pressure in boost pressure FB control is made smaller than in the case where the rate of rise in the boost pressure in boost pressure OL control prior to the start of boost pressure FB control is relatively small.

Thus, the following effects are obtained. That is, in the boost pressure control system described in Patent Document 1, while the boost pressure deviation is relatively large, the boost pressure is controlled through open-loop control. Thus, the boost pressure is raised at a relatively large rate of rise. Accordingly, this allows the boost pressure to swiftly approach the target boost pressure. Then, if the boost pressure deviation becomes relatively small, the boost pressure is controlled through feedback control. It should be noted herein that if the rate of rise in the boost pressure during boost pressure FB control is not limited at all, the possibility of the occurrence of a so-called overshoot, namely, an excess of the boost pressure far above the target boost pressure during boost pressure FB control is higher in the case where the rate of rise in the boost pressure in boost pressure OL control prior to the start of boost pressure FB control is relatively large than in the case where the rate of rise in the boost pressure in boost pressure OL control prior to the start of boost pressure FB control is relatively small. However, in the boost pressure control system described in Patent Document 1, the rate of rise in the boost pressure during boost pressure FB control is made smaller in the case where the rate of rise in the boost pressure during boost pressure OL control prior to the start of boost pressure FB control is relatively large than in the case where the rate of rise in the boost pressure during boost pressure OL control prior to the start of boost pressure FB control is relatively small. Therefore, an overshoot, namely, an excess of the boost pressure far above the target boost pressure during boost pressure FB control is restrained from occurring. That is, according to the boost pressure control system described in Patent Document 1, an effect of making it possible to make the boost pressure swiftly approach the target boost pressure and suppress an overshoot, namely, an excess of the boost pressure far above the target boost pressure is obtained.

RELATED ART DOCUMENTS

Patent Documents

Patent Document 1: Japanese Patent Application Publication No. 2007-127001 (JP-2007-127001 A)

Patent Document 2: Japanese Patent Application Publication No. 2009-92055 (JP-2009-92055 A)

SUMMARY OF THE INVENTION

Problem to be Solved by the Invention

By the way, in Patent Document 1, there is described a method for suppressing an overshoot, namely, an excess of a boost pressure far above a target boost pressure when the control utilized to control a boost pressure is changed over from boost pressure OL control to boost pressure FB control in the case where boost pressure OL control and boost pressure FB control are selectively utilized in accordance with a boost pressure deviation.

However, an overshoot, namely, an excess of a gas pressure far above a target gas pressure needs to be suppressed also in a control apparatus for an internal combustion engine which includes fuel supply means for supplying fuel to combustion chambers and gas compression means for compressing gas supplied to the combustion chambers and in which a degree to which gas is compressed by the gas compression means changes in accordance with a fuel supply amount (i.e., an amount of fuel supplied to the combustion chambers by the fuel supply means), the control apparatus being able to selectively perform single control as the control designed to control a gas pressure to a target gas pressure as a target value thereof without considering a change in the fuel supply amount and a change in the gas pressure that acts as a disturbance on the control of the gas pressure (i.e., a pressure of gas compressed by the gas compression means), and composite control as the control designed to control the gas pressure to the target gas pressure in consideration of a change in the fuel supply amount and a change in the gas pressure that acts as a disturbance on the control of the gas pressure.

It is thus an object of the invention to suppress an overshoot, namely, an excess of the gas pressure far above the target gas pressure in the aforementioned control apparatus for the internal combustion engine.

Means for Solving the Problem

The invention according to the present application relates to a control apparatus for an internal combustion engine including a control target that controls controlled variable. The control apparatus according to the invention is capable of selectively performing single control that is control for controlling the controlled variable to a target value thereof without considering a change in the controlled variable that acts as a disturbance on control of the controlled variable, and composite control that is control for controlling the controlled variable to the target value thereof in consideration of the change in the controlled variable that acts as the disturbance on the control of the controlled variable. In addition, in the invention, the controlled variable is controlled to the target value thereof through the single control when an absolute value of a controlled variable change rate that is an amount of change in the controlled variable per unit time is equal to or smaller than a predetermined controlled variable change rate, and the controlled variable is controlled to the target value thereof through the composite control when the absolute value of the controlled variable change rate is larger than the predetermined controlled variable change rate.

According to the invention, the following effects are obtained. That is, when the change in the controlled variable is relatively large, the degree to which the change in the controlled variable acts as a disturbance on the control of the controlled variable is relatively large. Accordingly, when the change in the controlled variable is relatively large, the possibility of the occurrence of a so-called overshoot, namely, an excess of the rising controlled variable far above the target value thereof (this will be referred to hereinafter as "an overshoot of the controlled variable") or a so-called undershoot, namely, an excess of the falling controlled variable far below the target value thereof (this will be referred to hereinafter as "an undershoot of the controlled variable") is high. Accordingly, from the standpoint of suppressing this overshoot of the controlled variable or this undershoot of the controlled variable, it is preferable to cause the control of the controlled variable to reflect the change in the controlled variable when the change in the controlled variable is relatively large. On the other hand, when the change in the controlled variable is relatively small, the degree to which the change in the controlled variable acts as a disturbance on the control of the controlled variable is relatively small. Accordingly, when the change in the controlled variable is relatively small, the possibility of the occurrence of an overshoot of the controlled variable or an undershoot of the controlled variable is low. Accordingly, when the change in the controlled variable is relatively small, there is little need to cause the control of the controlled variable to reflect the change in the controlled variable, from the standpoint of suppressing an overshoot of the controlled variable or an undershoot of the controlled variable.

It should be noted herein that in the invention, the controlled variable is controlled to the target value thereof through composite control when the absolute value of the controlled variable change rate is larger than the predetermined controlled variable change rate. It should be noted herein that composite control according to the invention is the control designed to control the controlled variable to the target value thereof in consideration of the change in the controlled variable that acts as a disturbance on the control of the controlled variable. That is, in the invention, the controlled variable is controlled to the target value thereof in consideration of the change in the controlled variable when the absolute value of the controlled variable change rate is larger than the predetermined controlled variable change rate and hence the degree to which the change in the controlled variable acts as a disturbance on the control of the controlled variable is relatively large.

Thus, even when the degree to which the change in the controlled variable acts as a disturbance on the control of the controlled variable is relatively large, an effect of making it possible to suppress an overshoot of the controlled variable or an undershoot of the controlled variable is obtained.

Incidentally, single control according to the invention, namely, the control designed to control the controlled variable to the target value thereof without considering the change in the controlled variable that acts as a disturbance on the control of the controlled variable is used to control the controlled variable when the absolute value of the controlled variable change rate is equal to or smaller than the predetermined controlled variable change rate. That is, single control according to the invention is used to control the controlled variable when the degree to which the change in the controlled variable acts as a disturbance on the control of the controlled variable is relatively small. Accordingly, in this case, even if single control is used to control the controlled variable, an overshoot of the controlled variable or an undershoot of the controlled variable is suppressed.

Besides, in another invention of the present application, in the aforementioned invention, when the control of the controlled variable is changed over from the single control to the composite control, the composite control is started using, as an initial value of the disturbance in the composite control, the disturbance on the control of the controlled variable resulting from the change in the controlled variable at a time when the controlled variable has reached a stable equilibrium state through the control of the controlled variable by the composite control.

According to the invention, the following effects are obtained. That is, when the control of the controlled variable is changed over from single control to composite control, the control of the controlled variable is changed over from the control that does not consider the change in the controlled variable that acts as a disturbance on the control of the controlled variable to the control that considers the change in the controlled variable that acts as a disturbance on the control of the controlled variable. That is, the mode of the control of the controlled variable greatly changes. Then, at this time, the stability of composite control becomes low. On the other hand, when the controlled variable has reached a stable equilibrium state through the control of the controlled variable by composite control, the stability of composite control is high. It should be noted herein that in the invention, when the control of the controlled variable is changed over from single control to composite control, composite control is started using a disturbance on the control of the controlled variable resulting from a change in the controlled variable at the time when the controlled variable has reached the stable equilibrium state through the control of the controlled variable by the composite control, as an initial value of the disturbance of the composite control. That is, in the invention, the composite control is started using a disturbance at the time when the stability of composite control is high, as an initial value of the disturbance in the composite control. In consequence, according to the invention, an effect of making it possible to hold the stability of the composite control high at a time point when the composite control is started is obtained.

Besides, still another invention of the present application relates to a control apparatus for an internal combustion engine which includes control targets that control two different controlled variables respectively, and in which, depending on a first controlled variable that is the controlled variable controlled by a first control target as one of the control targets, a second controlled variable that is the controlled variable controlled by a second control target as the other control target changes. The control apparatus according to the invention is capable of selectively performing single control that is control for controlling the second controlled variable to a target value thereof without considering a change in the first controlled variable that acts as a disturbance on control of the second controlled variable, and composite control that is control for controlling the second controlled variable to the target value thereof in consideration of the change in the first controlled variable that acts as the disturbance on the control of the second controlled variable. In addition, in the invention, the second controlled variable is controlled to the target value thereof through the single control when an absolute value of a first controlled variable change rate that is an amount of change in the first controlled variable per unit time is equal to or smaller than a predetermined first controlled variable change rate, and the second controlled variable is controlled to the target value thereof through the composite control when the absolute value of the first controlled variable change rate is larger than the predetermined first controlled variable change rate.

According to the invention, the following effects are obtained. That is, in the case where the second controlled variable changes in accordance with the first controlled variable, when the change in the first controlled variable is relatively large, the degree to which the change in the first controlled variable acts as a disturbance on the control of the second controlled variable is relatively large. Accordingly, when the change in the first controlled variable is relatively large, the possibility of the occurrence of a so-called overshoot, namely, an excess of the rising second controlled variable far above the target value thereof (this will be referred to hereinafter as "an overshoot of the second controlled variable") or a so-called undershoot, namely, an excess of the falling second controlled variable far below the target value thereof (this will be referred to hereinafter as "an undershoot of the second controlled variable") is high. Accordingly, from the standpoint of suppressing this overshoot of the second controlled variable or this undershoot of the second controlled variable, it is preferable to cause the control of the second controlled variable to reflect the change in the first controlled variable when the change in the first controlled variable is relatively large. On the other hand, even in the case where the second controlled variable changes in accordance with the first controlled variable, when the change in the first controlled variable is relatively small, the degree to which the change in the first controlled variable acts as a disturbance on the control of the second controlled variable is relatively small. Accordingly, when the change in the first controlled variable is relatively small, the possibility of the occurrence of an overshoot of the second controlled variable or an undershoot of the second controlled variable is low. Accordingly, when the change in the first controlled variable is relatively small, there is little need to cause the control of the second controlled variable to reflect the change in the first controlled variable, from the standpoint of suppressing an overshoot of the second controlled variable or an undershoot of the second controlled variable.

It should be noted herein that in the invention, the second controlled variable is controlled to the target value thereof through composite control when the absolute value of the first controlled variable change rate is larger than the predetermined first controlled variable change rate. It should be noted herein that composite control according to the invention is the control designed to control the second controlled variable to the target value thereof in consideration of the change in the first controlled variable that acts as a disturbance on the control of the second controlled variable. That is, in the invention, the second controlled variable is controlled to the target value thereof in consideration of the change in the first controlled variable when the absolute value of the first controlled variable change rate is larger than the predetermined first controlled variable change rate and hence the degree to which the change in the first controlled variable acts as a disturbance on the control of the second controlled variable is relatively large.

Thus, even when the degree to which the change in the first controlled variable acts as a disturbance on the control of the second controlled variable is relatively large, an effect of making it possible to suppress an overshoot of the second controlled variable or an undershoot of the second controlled variable is obtained.

Incidentally, single control according to the invention, namely, the control designed to control the second controlled variable to the target value thereof without considering the change in the first controlled variable that acts as a disturbance on the control of the second controlled variable is used to control the second controlled variable when the absolute value of the first controlled variable change rate is equal to or smaller than the predetermined first controlled variable change rate. That is, single control according to the invention is used to control the second controlled variable when the degree to which the change in the first controlled variable acts as a disturbance on the control of the second controlled variable is relatively small. Accordingly, in this case, even if single control is used to control the second controlled variable, an overshoot of the second controlled variable or an undershoot of the second controlled variable is suppressed.

Besides, in still another invention of the present application, in the aforementioned invention, when the control of the second controlled variable is changed over from the single control to the composite control, the composite control is started using, as an initial value of the disturbance in the composite control, the disturbance on the control of the second controlled variable resulting from the change in the first controlled variable at a time when the second controlled variable reached a stable equilibrium state through the control of the second controlled variable by the composite control.

According to the invention, the following effects are obtained. That is, when the control of the second controlled variable is changed over from single control to composite control, the control of the second controlled variable is changed over from the control that does not consider the change in the first controlled variable that acts as a disturbance on the control of the second controlled variable to the control that considers the change in the first controlled variable that acts as a disturbance on the control of the second controlled variable. That is, the mode of the control of the second controlled variable greatly changes. Then, at this time, the stability of composite control becomes low. On the other hand, when the second controlled variable has reached a stable equilibrium state through the control of the second controlled variable by composite control, the stability of composite control is high. It should be noted herein that in the invention, when the control of the second controlled variable is changed over from single control to composite control, composite control is started using a disturbance on the control of the second controlled variable resulting from a change in the first controlled variable at the time when the second controlled variable has reached the stable equilibrium state through the control of the second controlled variable by the composite control, as an initial value of the disturbance of the composite control. That is, in the invention, the composite control is started using a disturbance at the time when the stability of composite control is high, as an initial value of the disturbance in the composite control. In consequence, according to the invention, an effect of making it possible to hold the stability of the composite control high at a time point when the composite control is started is obtained.

Besides, still another invention of the present application relates to a control apparatus for an internal combustion engine which includes control targets that control two different controlled variables respectively, and in which, depending on a first controlled variable that is the controlled variable controlled by a first control target as one of the control targets, a second controlled variable that is the controlled variable controlled by a second control target as the other control target changes. The control apparatus according to the invention is capable of selectively performing single control that is control for controlling the second controlled variable to a target value thereof without considering a change in the first controlled variable and a change in the second control variable that act as a disturbance on control of the second controlled variable, and composite control that is control for controlling the second controlled variable to the target value thereof in consideration of the change in the first controlled variable and the change in the second controlled variable that act as the disturbance on the control of the second controlled variable. In addition, in the invention, the second controlled variable is controlled to the target value thereof through the single control when an absolute value of a first controlled variable change rate that is an amount of change in the first controlled variable per unit time is equal to or smaller than a predetermined first controlled variable change rate and an absolute value of a second controlled variable change rate that an amount of change in the second controlled variable per unit time is equal to or smaller than a predetermined second controlled variable change rate, and the second controlled variable is controlled to the target value thereof through the composite control when the absolute value of the first controlled variable change rate is larger than the predetermined first controlled variable change rate or when the absolute value of the second controlled variable change rate is larger than the predetermined second controlled variable change rate.

According to the invention, the following effects are obtained. That is, in the case where the second controlled variable changes in accordance with the first controlled variable, when the change in the first controlled variable is relatively large, the degree to which the change in the first controlled variable acts as a disturbance on the control of the second controlled variable is relatively large. Accordingly, when the change in the first controlled variable is relatively large, the possibility of the occurrence of an overshoot of the second controlled variable or an undershoot of the second controlled variable is high. Accordingly, from the standpoint of suppressing this overshoot of the second controlled variable or this undershoot of the second controlled variable, it is preferable to cause the control of the second controlled variable to reflect the change in the first controlled variable when the change in the first controlled variable is relatively large. On the other hand, even in the case where the second controlled variable changes in accordance with the first controlled variable, when the change in the first controlled variable is relatively small, the degree to which the change in the first controlled variable acts as a disturbance on the control of the second controlled variable is relatively small. Accordingly, when the change in the first controlled variable is relatively small, the possibility of the occurrence of an overshoot of the second controlled variable or an undershoot of the second controlled variable is low. Accordingly, when the change in the first controlled variable is relatively small, there is little need to cause the control of the second controlled variable to reflect the change in the first controlled variable, from the standpoint of suppressing an overshoot of the second controlled variable or an undershoot of the second controlled variable.

Besides, when the change in the second controlled variable is relatively large, the degree to which the change in the second controlled variable acts as a disturbance on the control of the second controlled variable is relatively large. Accordingly, when the change in the second controlled variable is relatively large, the possibility of the occurrence of an overshoot of the second controlled variable or an undershoot of the second controlled variable is high. Accordingly, from the standpoint of suppressing this overshoot of the second controlled variable or this undershoot of the second controlled variable, it is preferable to cause the control of the second controlled variable to reflect the change in the second controlled variable when the change in the second controlled variable is relatively large. On the other hand, when the change in the second controlled variable is relatively small, the degree to which the change in the second controlled variable acts as a disturbance on the control of the second controlled variable is relatively small. Accordingly, when the change in the second controlled variable is relatively small, the possibility of the occurrence of an overshoot of the second controlled variable or an undershoot of the second controlled variable is low. Accordingly, when the change in the second controlled variable is relatively small, there is little need to cause the control of the second controlled variable to reflect the change in the second controlled variable, from the standpoint of suppressing an overshoot of the second controlled variable or an undershoot of the second controlled variable.

It should be noted herein that in the invention, the second controlled variable is controlled to the target value thereof through composite control when the absolute value of the first controlled variable change rate is larger than the predetermined first controlled variable change rate or when the absolute value of the second controlled variable change rate is larger than the predetermined second controlled variable change rate. It should be noted herein that composite control according to the invention is the control designed to control the second controlled variable to the target value thereof in consideration of the change in the first controlled variable and the change in the second controlled variable that act as a disturbance on the control of the second controlled variable. That is, in the invention, the second controlled variable is controlled to the target value thereof in consideration of the change in the first controlled variable when the absolute value of the first controlled variable change rate is larger than the predetermined first controlled variable change rate and hence the degree to which the change in the first controlled variable acts as a disturbance on the control of the second controlled variable is relatively large, and the second controlled variable is controlled to the target value thereof in consideration of the change in the second controlled variable when the absolute value of the second controlled variable change rate is larger than the predetermined second controlled variable change rate and hence the degree to which the change in the second controlled variable acts as a disturbance on the control of the second controlled variable is relatively large.

Thus, even when the degree to which the change in the first controlled variable acts as a disturbance on the control of the second controlled variable is relatively large, or even when the degree to which the change in the second controlled variable acts as a disturbance on the control of the second controlled variable is relatively large, an effect of making it possible to suppress an overshoot of the second controlled variable or an undershoot of the second controlled variable is obtained.

Incidentally, single control according to the invention, namely, the control designed to control the second controlled variable to the target value thereof without considering the change in the first controlled variable and the change in the second controlled variable that act as a disturbance on the control of the second controlled variable is used to control the second controlled variable when the absolute value of the first controlled variable change rate is equal to or smaller than the predetermined first controlled variable change rate and the absolute value of the second controlled variable change rate is equal to or smaller than the predetermined second controlled variable change rate. That is, single control according to the invention is used to control the second controlled variable when the degree to which the change in the first controlled variable and the change in the second controlled variable act as a disturbance on the control of the second controlled variable is relatively small. Accordingly, in this case, even if single control is used to control the second controlled variable, an overshoot of the second controlled variable or an undershoot of the second controlled variable is suppressed.

Besides, in still another invention of the present application, in the aforementioned invention, when control of the second controlled variable is changed over from the single control to the composite control, the composite control is started using, as an initial value of the disturbance in the composite control, the disturbance on the control of the second controlled variable resulting from the change in the first controlled variable and the change in the second controlled variable at a time when the second controlled variable has reached a stable equilibrium state through the control of the second controlled variable by the composite control.

According to the invention, the following effects are obtained. That is, when the control of the second controlled variable is changed over from single control to composite control, the control of the second controlled variable is changed over from the control that does not consider the change in the first controlled variable and the second controlled variable that act as a disturbance on the control of the second controlled variable to the control that considers the change in the first controlled variable and the change in the second controlled variable that act as a disturbance on the control of the second controlled variable. That is, the mode of the control of the second controlled variable greatly changes. Then, at this time, the stability of composite control becomes low. On the other hand, when the second controlled variable has reached a stable equilibrium state through the control of the second controlled variable by composite control, the stability of composite control is high. It should be noted herein that in the invention, when the control of the second controlled variable is changed over from single control to composite control, composite control is started using a disturbance on the control of the second controlled variable resulting from a change in the first controlled variable and a change in the second controlled variable at the time when the second controlled variable has reached the stable equilibrium state through the control of the second controlled variable by the composite control, as an initial value of the disturbance of the composite control. That is, in the invention, the composite control is started using a disturbance at the time when the stability of composite control is high, as an initial value of the disturbance in the composite control. In consequence, according to the invention, an effect of making it possible to hold the stability of the composite control high at a time point when the composite control is started is obtained.

MODES FOR CARRYING OUT THE INVENTION

One embodiment (hereinafter referred to as "the first embodiment of the invention") of a control apparatus of an internal combustion engine according to the invention will be described. Incidentally, in the following description, the term "engine operation" means "operation of the internal combustion engine", and the term "engine rotational speed" means "rotational speed of the internal combustion engine".

Figure 1:
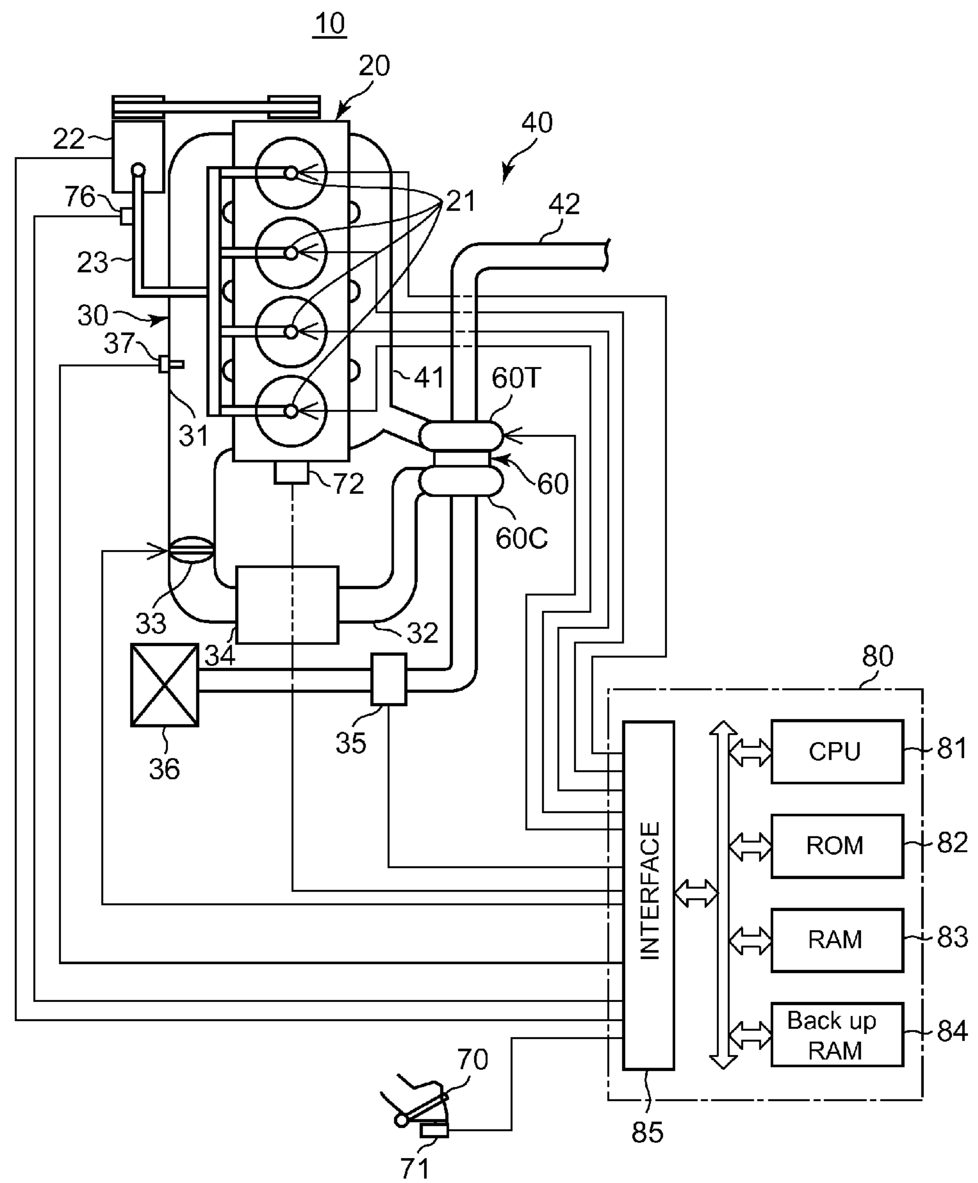
FIG. 1 is a view showing an internal combustion engine to which a control apparatus according to the invention is applied.

The internal combustion engine to which the control apparatus according to the first embodiment of the invention is applied is shown in FIG. 1. The internal combustion engine shown in FIG. 1 is a compression self-ignition type internal combustion engine (a so-called diesel engine). In FIG. 1, an internal combustion engine is denoted by 10, a body of the internal combustion engine 10 is denoted by 20, fuel injection valves are denoted by 21, a fuel pump is denoted by 22, a fuel supply passage is denoted by 23, an intake passage is denoted by 30, an intake manifold is denoted by 31, an intake pipe is denoted by 32, a throttle valve is denoted by 33, an intercooler is denoted by 34, an airflow meter is denoted by 35, an air cleaner is denoted by 36, a boost pressure sensor is denoted by 37, an exhaust passage is denoted by 40, an exhaust manifold is denoted by 41, an exhaust pipe is denoted by 42, a supercharger is denoted by 60, an accelerator pedal is denoted by 7, an accelerator pedal depression amount sensor is denoted by 71, a crank position sensor is denoted by 72, and an electronic control unit is denoted by 80. The intake passage 30 is constituted of the intake manifold 31 and the intake pipe 32. The exhaust passage 40 is constituted of the exhaust manifold 41 and the exhaust pipe 42.

The electronic control unit 80 is configured as a microcomputer. Besides, the electronic control unit 80 has a microprocessor (a CPU) 81, a read only memory (a ROM) 82, a random access memory (a RAM) 83, a backup RAM 84, and an interface 85. These components, namely, the CPU 81, the ROM 82, the RAM 83, the backup RAM 84, and the interface 85 are connected to one another by a bidirectional bus.

The fuel injection valves 21 are fitted to the body 20 of the internal combustion engine. The fuel pump 22 is connected to the fuel injection valves 21 via the fuel supply passage 23. The fuel pump 22 supplies high-pressure fuel to the fuel injection valves 21 via the fuel supply passage 23. Besides, the fuel injection valves 21 are electrically connected to the interface 85 of the electronic control unit 80. The electronic control unit 80 supplies the fuel injection valves 21 with a command signal for causing the fuel injection valves 21 to inject fuel. Besides, the fuel pump 22 is also electrically connected to the interface 85 of the electronic control unit 80. The electronic control unit 80 supplies the fuel pump 22 with a control signal that controls the operation of the fuel pump 22 such that the pressure of fuel supplied from the fuel pump 22 to the fuel injection valves 21 is held equal to a predetermined pressure. Incidentally, the fuel injection valves 21 are fitted to the body 20 of the internal combustion engine such that fuel injection holes of the fuel injection valves 21 are exposed to the interiors of combustion chambers respectively. Accordingly, when a command signal is supplied from the electronic control unit 80 to the fuel injection valves 21, the fuel injection valves 21 directly inject fuel into the combustion chambers respectively.

The intake manifold 31 branches off, at one end thereof, into a plurality of pipes. These branch pipes are connected to intake ports (not shown), which are formed in such a manner as to correspond to the combustion chambers of the body 20 of the internal combustion engine respectively. Besides, the intake manifold 31 is connected at the other end thereof to one end of the intake pipe 32.

The exhaust manifold 41 branches off, at one end thereof, into a plurality of pipes. These branch pipes are connected to exhaust ports (not shown), which are formed in such a manner as to correspond to the combustion chambers of the body 20 of the internal combustion engine respectively. Besides, the exhaust manifold 41 is connected at the other end thereof to one end of the exhaust pipe 42.

The throttle valve 33 is arranged in the intake pipe 32. Besides, if the opening degree of the throttle valve 33 (this opening degree will be referred to hereinafter as "a throttle valve opening degree") is changed, the flow passage area in the intake pipe 32 in a region where the throttle valve 33 is arranged changes. Thus, the amount of air passing through the throttle valve 33 changes, and hence the amount of air sucked into the combustion chambers changes. The throttle valve 33 is electrically connected to the interface 85 of the electronic control unit 80. The electronic control unit 80 supplies the throttle valve 33 with a control signal for operating the throttle valve 33.

The intercooler 34 is arranged in the intake pipe 32 upstream of the throttle valve 33. The intercooler 34 cools the air flowing thereinto.

The airflow meter 35 is arranged in the intake pipe 32 upstream of the intercooler 34. Besides, the airflow meter 35 is electrically connected to the interface 85 of the electronic control unit 80. The airflow meter 35 outputs an output value corresponding to an amount of air flowing therethrough. This output value is input to the electronic control unit 80. On the basis of this output value, the electronic control unit 80 calculates an amount of air passing through the airflow meter 35, namely, an amount of air sucked into the combustion chambers.

The boost pressure sensor 37 is arranged in the intake passage 30 (more specifically, the intake manifold 31) downstream of the throttle valve 33. Besides, the boost pressure sensor 37 is electrically connected to the interface 85 of the electronic control unit 80. The boost pressure sensor 37 outputs an output value corresponding to a pressure of gas therearound (i.e., a pressure of gas that exists in the intake manifold 31 and is sucked into the combustion chambers). On the basis of this output value, the electronic control unit 80 calculates a pressure of gas around the boost pressure sensor 37, namely, a pressure of gas sucked into the combustion chambers (this pressure of the gas will be referred to hereinafter as "a boost pressure").

The accelerator pedal depression amount sensor 71 is connected to the accelerator pedal 70. The accelerator pedal depression amount sensor 71 is electrically connected to the interface 85 of the electronic control unit 80. The accelerator pedal depression amount sensor 71 outputs an output value corresponding to a depression amount of the accelerator pedal 70. This output value is input to the electronic control unit 80. On the basis of this output value, the electronic control unit 80 calculates a depression amount of the accelerator pedal 70, and hence a torque required of the internal combustion engine (this torque will be referred to hereinafter as "a required engine torque").

The crank position sensor 72 is arranged in the vicinity of a crankshaft (not shown) of the internal combustion engine. Besides, the crank position sensor 72 is electrically connected to the interface 85 of the electronic control unit 80. The crank position sensor 72 outputs an output value corresponding to a rotational phase of the crankshaft. This output value is input to the electronic control unit 80. The electronic control unit 80 calculates an engine rotational speed on the basis of this output value.

Figure 2:
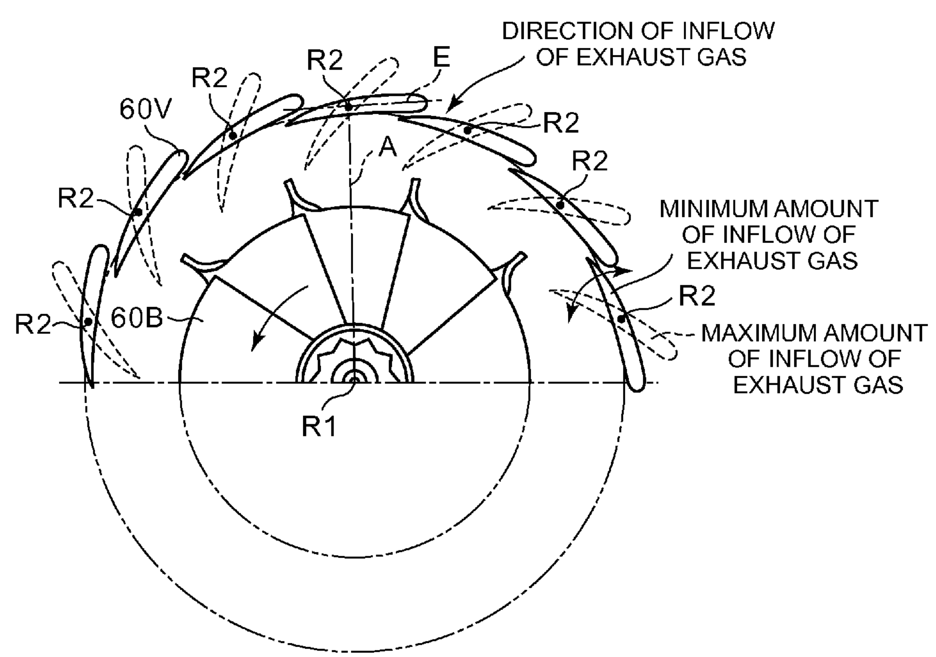
FIG. 2 is a view showing an exhaust turbine of a supercharger of the internal combustion engine shown in FIG. 1.

The supercharger 60 has a compressor 60C and an exhaust turbine 60T. The supercharger 60 compresses the gas sucked into the combustion chambers, thereby making it possible to raise the pressure of the gas. The compressor 60C is arranged in the intake passage 30 (more specifically, the intake pipe 32) upstream of the intercooler 34. The exhaust turbine 60T is arranged in the exhaust passage 40 (more specifically, the exhaust pipe 42). As shown in FIG. 2, the exhaust turbine 60T has an exhaust turbine body 60B and a plurality of wing-like vanes 60V. The compressor 60C and the exhaust turbine 60T (more specifically, the exhaust turbine body 60B) are coupled to each other by a shaft (not shown). When the exhaust turbine is caused to rotate by exhaust gas, rotation of the exhaust turbine is transmitted to the compressor 60C by the shaft, whereby the compressor 60C is caused to rotate. Incidentally, the gas in the intake passage 30 downstream of the compressor is compressed due to rotation of the compressor 60C, so that the pressure of the gas is raised.

On the other hand, the vanes 60V are radially arranged at equal angular intervals around a rotation center axis R1 of the exhaust turbine body 60B in such a manner as to surround the exhaust turbine body. Besides, each of the vanes 60V is arranged turnably around a corresponding one of axes indicated by reference symbols R2 in FIG. 2. In addition, if a direction in which each of the vanes 60V extends (i.e., a direction indicated by a reference symbol E in FIG. 2) is referred to as "an extension direction" and a line coupling the rotation center axis R1 of the exhaust turbine body 60B to a turning axis R2 of each of the vanes 60V (i.e., a line denoted by a reference symbol A in FIG. 2) is referred to as "a reference line", the respective vanes 60V are turned such that the angle formed by the extension direction E thereof and the reference line A corresponding thereto becomes equal as to all the vanes 60V. Then, if the respective vanes 60V are turned such that the angle formed by the extension direction E thereof and the reference line A corresponding thereto decreases, namely, such that the flow passage area between adjacent ones of the vanes 60V becomes small, the pressure in the exhaust passage 40 upstream of the exhaust turbine body 60B (this pressure will be referred to hereinafter as "an exhaust gas pressure") rises, so that the flow velocity of exhaust gas supplied to the exhaust turbine body 60B increases. Thus, the rotational speed of the exhaust turbine body 60B increases, so that the rotational speed of the compressor 60C also increases. Accordingly, the gas flowing in the intake passage 30 is greatly compressed by the compressor 60C. Thus, as the angle formed by the extension direction E of each of the vanes 60V and the reference line corresponding thereto (this angle will be referred to hereinafter as "a vane opening degree") decreases, the degree to which the gas flowing in the intake passage 30 is compressed by the compressor 60C increases (i.e., the boost pressure rises).

Besides, the vanes 60V are electrically connected to the interface 85 of the electronic control unit 80. The electronic control unit 80 supplies the vanes 60V with a control signal for operating the vanes 60V.

Next, the control of the fuel injection valves according to the first embodiment of the invention will be described. Incidentally, in the following description, "the fuel injection amount" means "an amount of fuel injected from the fuel injection valves". In the first embodiment of the invention, a command signal for causing the fuel injection valves to inject fuel whose amount is equivalent to a target value of the fuel injection amount that is set in accordance with the accelerator pedal depression amount (this target value will be referred to hereinafter as "a target fuel injection amount" and details thereof will be described later) is calculated in the electronic control unit. This command signal is supplied from the electronic control unit to the fuel injection valves, whereby the fuel injection valves are operated.

Figure 3:
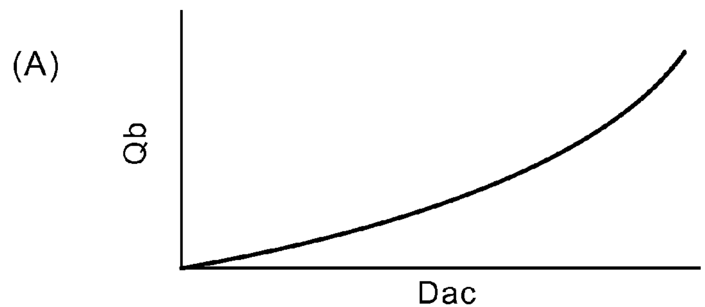
FIG. 3(A) is a view showing a map that is used to acquire a reference fuel injection amount.
FIG. 3(B) is a map that is used to acquire a reference throttle valve opening degree.
FIG. 3(C) is a view showing a map that is used to acquire a reference boost pressure.
Figure 3:
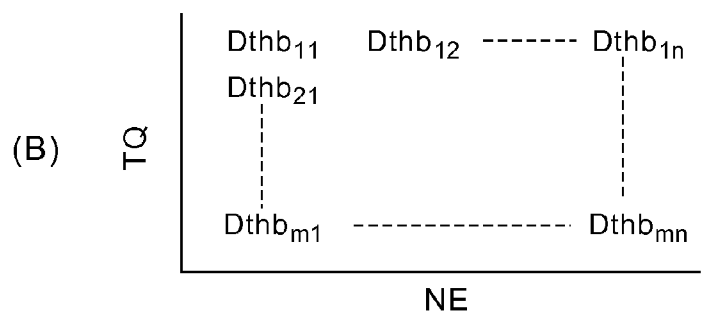
Figure 3:
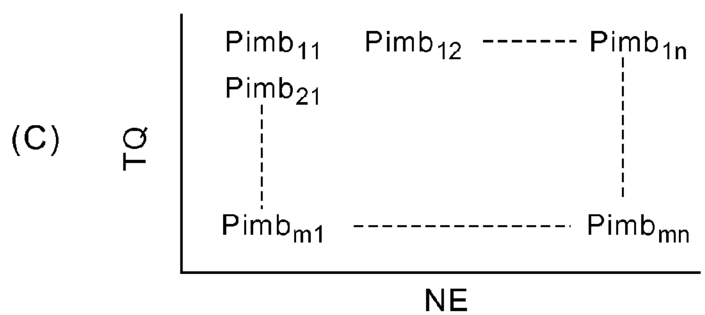

Next, a target fuel injection amount according to the first embodiment of the invention will be described. In the first embodiment of the invention, in the internal combustion engine shown in FIG. 1, optimal fuel injection amounts are obtained in advance through an experiment or the like, in accordance with depression amounts of the accelerator pedal respectively. In addition, these obtained fuel injection amounts are stored in the electronic control unit as a reference fuel injection amount Qb in the form of a map of a function of a depression amount Dac of the accelerator pedal as shown in FIG. 3(A). Then, during engine operation, the reference fuel injection amount Qb corresponding to the depression amount Dac of the accelerator pedal at each moment is acquired from the map of FIG. 3(A), and this acquired reference fuel injection amount Qb is set as the target fuel injection amount. Incidentally, as shown in FIG. 3(A), the reference fuel injection amount Qb increases as the depression amount Dac of the accelerator pedal increases.

Next, the control of the throttle valve according to the first embodiment of the invention will be described. Incidentally, in the following description, the term "engine operation state" means "an operation state of the internal combustion engine", and the term "throttle valve opening degree" means "an opening degree of the throttle valve".

In the first embodiment of the invention, a control signal for operating the throttle valve such that a throttle valve opening degree equivalent to a target value of the opening degree of the throttle valve that is set in accordance with the engine operation state (this target value will be referred to hereinafter as "a target throttle valve opening degree" and details thereof will be described hereinafter) is achieved is calculated in the electronic control unit. This control signal is supplied from the electronic control unit to the throttle valve, whereby the throttle valve is operated.

Next, the target throttle valve opening degree according to the first embodiment of the invention will be described. In the first embodiment of the invention, appropriate throttle valve opening degrees are obtained in advance through an experiment or the like, in accordance with engine operation states that are prescribed by engine rotational speeds and required engine torques respectively. Then, these obtained throttle valve opening degrees are stored in the electronic control unit as a reference throttle valve opening degree Dthb in the form of a map of a function of an engine rotational speed NE and a required engine torque TQ as shown in FIG. 3(B). Then, during engine operation, the reference throttle valve opening degree Dthb corresponding to the engine rotational speed NE at each moment and the required engine torque TQ at each moment is acquired from the map of FIG. 3(B). Then, the reference throttle valve opening degree Dthb thus acquired is set as the target throttle valve opening degree. Incidentally, in the map of FIG. 3(B), the reference throttle valve opening degree Dthb increases as the engine rotational speed NE increases, and the reference throttle opening degree Dthb increases as the required engine torque TQ increases.

Next, the control of the vanes according to the first embodiment of the invention will be described. In the first embodiment of the invention, a controller (this controller will be referred to hereinafter as "a composite controller") is prepared. A deviation of an actual boost pressure at each moment from the target boost pressure (this deviation will be referred to hereinafter as "a boost pressure deviation") and an amount of change in the boost pressure per unit time (this amount of change will be referred to hereinafter as "a boost pressure change rate") are input to the composite controller as pieces of input information. The composite controller is designed to generate a control signal for driving the vanes such that the boost pressure approaches the target boost pressure with desired tracking properties on the basis of these pieces of input information. Furthermore, a controller (this controller will be referred to hereinafter as "a single controller") is prepared. The boost pressure change rate is not input to the single controller as input information, and the boost pressure deviation is input to the single controller as input information. The single controller is designed to generate a control signal for driving the vanes such that the boost pressure approaches the target boost pressure with desired tracking properties on the basis of this input information. In addition, composite control for controlling the boost pressure to the target boost pressure by supplying the vanes with the control signal generated through the use of the aforementioned composite controller, and single control for controlling the boost pressure to the target boost pressure by supplying the vanes with the control signal generated through the use of the aforementioned single controller can be selectively performed.

Then, during engine operation, if the absolute value of the boost pressure change rate is equal to or smaller than a predetermined boost pressure change rate, the boost pressure is controlled to the target boost pressure through the aforementioned single control. On the other hand, during engine operation, if the absolute value of the boost pressure change rate is larger than the aforementioned predetermined boost pressure change rate, the boost pressure is controlled to the target boost pressure through the aforementioned composite control.

Next, the setting of the target boost pressure according to the first embodiment of the invention will be described. In the first embodiment of the invention, optimal boost pressures are obtained in advance through an experiment or the like in accordance with engine operation states that are prescribed by engine rotational speeds and required engine torques respectively. Then, these obtained boost pressures are stored in the electronic control unit as a reference boost pressure Pimb in the form of a map of a function of the engine rotational speed NE and the required engine torque TQ as shown in FIG. 3(C). Then, during engine operation, the reference boost pressure Pimb corresponding to the engine rotational speed NE at each moment and the required engine torque TQ at each moment is acquired from the map of FIG. 3(C). Then, the reference boost pressure Pimb thus acquired is set as the target boost pressure. Incidentally, in the map of FIG. 3(C), the reference boost pressure Pimb increases as the engine rotational speed NE increases, and the reference boost pressure Pimb increases as the required engine torque TQ increases.

According to the first embodiment of the invention, the following effects are obtained. That is, when the change in the boost pressure is relatively large, the degree to which the change in the boost pressure acts as a disturbance on the control of the boost pressure is relatively large. Accordingly, when the change in the boost pressure is relatively large, the possibility of the occurrence of a so-called overshoot, namely, an excess of the rising boost pressure far above the target boost pressure (this will be referred to hereinafter as "an overshoot of the boost pressure") or a so-called undershoot, namely, an excess of the falling boost pressure far below the target boost pressure (this will be referred to hereinafter as "an undershoot of the boost pressure") is high. Accordingly, from the standpoint of suppressing this overshoot of the boost pressure or this undershoot of the boost pressure, it is preferable to cause the control of the boost pressure to reflect the change in the boost pressure when the change in the boost pressure is relatively large. On the other hand, when the change in the boost pressure is small, the degree to which the change in the boost pressure acts as a disturbance on the control of the boost pressure is relatively small. Accordingly, when the change in the boost pressure is relatively small, the possibility of the occurrence of an overshoot of the boost pressure or an undershoot of the boost pressure is low. Accordingly, when the change in the boost pressure is relatively small, there is little need to cause the control of the boost pressure to reflect the change in the boost pressure, from the standpoint of suppressing an overshoot of the boost pressure or an undershoot of the boost pressure.

It should be noted herein that in the first embodiment of the invention, when the absolute value of the boost pressure change rate is larger than a predetermined boost pressure change rate, the boost pressure is controlled to the target boost pressure through composite control. It should be noted herein that composite control according to the first embodiment of the invention is the control designed to control the boost pressure to the target boost pressure in consideration of the change in the boost pressure that acts as a disturbance on the control of the boost pressure. That is, in the first embodiment of the invention, when the absolute value of the boost pressure change rate is larger than the predetermined boost pressure change rate and hence the degree to which the change in the boost pressure acts as a disturbance on the control of the boost pressure is relatively large, the boost pressure is controlled to the target boost pressure in consideration of the change in the boost pressure.

Thus, even when the degree to which the change in the boost pressure acts as a disturbance on the control of the boost pressure is relatively large, an effect of making it possible to suppress an overshoot of the boost pressure or an undershoot of the boost pressure is obtained.

Incidentally, single control according to the first embodiment of the invention, namely, the control designed to control the boost pressure to the target boost pressure without considering the change in the boost pressure that acts as a disturbance on the control of the boost pressure is used to control the boost pressure when the absolute value of the boost pressure change rate is equal to or smaller than the predetermined boost pressure change rate. That is, single control according to the first embodiment of the invention is used to control the boost pressure when the degree to which the change in the boost pressure acts as a disturbance on the control of the boost pressure is relatively small. Accordingly, in this case, even if single control is used to control the boost pressure, an overshoot of the boost pressure or an undershoot of the boost pressure is suppressed.

Furthermore, since single control is the control of the boost pressure that does not consider the change in the boost pressure that acts as a disturbance on the control of the boost pressure, the load that is applied to the electronic control unit to perform this single control is relatively small. Accordingly, when single control is used to control the boost pressure, an effect of performing the control of the boost pressure with small load while suppressing an overshoot of the boost pressure or an undershoot of the boost pressure as described above is obtained.

Figure 4:
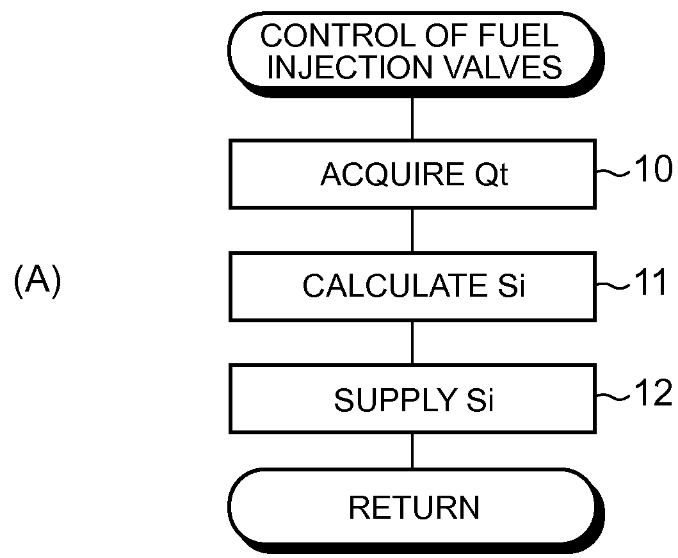
FIG. 4(A) is a view showing an example of a routine for performing the control of fuel injection valves according to a first embodiment of the invention.
FIG. 4(B) is a view showing an example of a routine for setting a target fuel injection amount according to the first embodiment of the invention.
Figure 4:
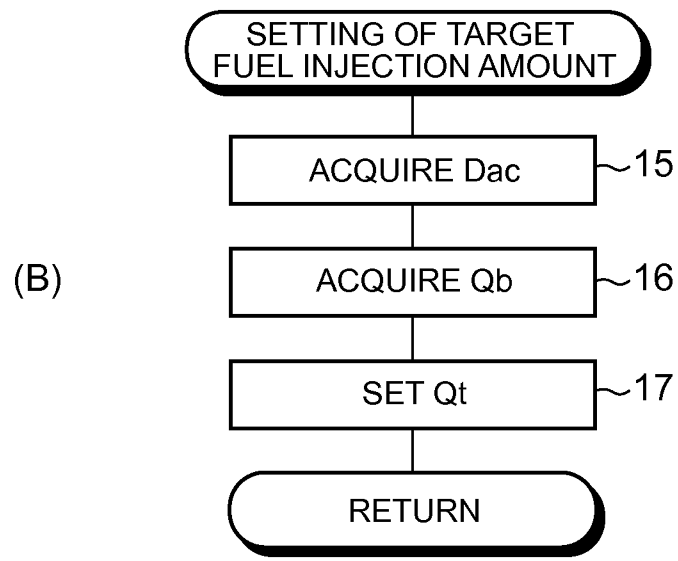

Next, an example of a routine for performing the control of the fuel injection valves according to the first embodiment of the invention will be described. The example of this routine is shown in FIG. 4(A). Incidentally, this routine is a routine that is started every time a predetermined crank angle is reached. If the routine of FIG. 4(A) is started, first of all in step 10, a latest target fuel injection amount Qt set in a routine of FIG. 4(B) (the details of this routine will be described later) is acquired. Subsequently in step 11, a command signal Si that should be supplied to the fuel injection valves is calculated on the basis of the target fuel injection amount Qt acquired in step 10. Subsequently in step 12, the command signal Si calculated in step 11 is supplied to the fuel injection valves, and then the routine ends.

Next, an example of a routine for setting the target fuel injection amount according to the first embodiment of the invention will be described. The example of this routine is shown in FIG. 4(B). Incidentally, this routine is a routine that is started every time a predetermined crank angle is reached in the case where the same routine has been ended. If the routine of FIG. 4(B) is started, first of all in step 15, an accelerator pedal depression amount Dac is acquired. Subsequently in step 16, a reference fuel injection amount Qb corresponding to the accelerator pedal depression amount Dac acquired in step 15 is acquired from the map of FIG. 3(A). Subsequently in step 17, the reference fuel injection amount Qb acquired in step 16 is set as the target fuel injection amount Qt, and then the routine ends.

Figure 5:
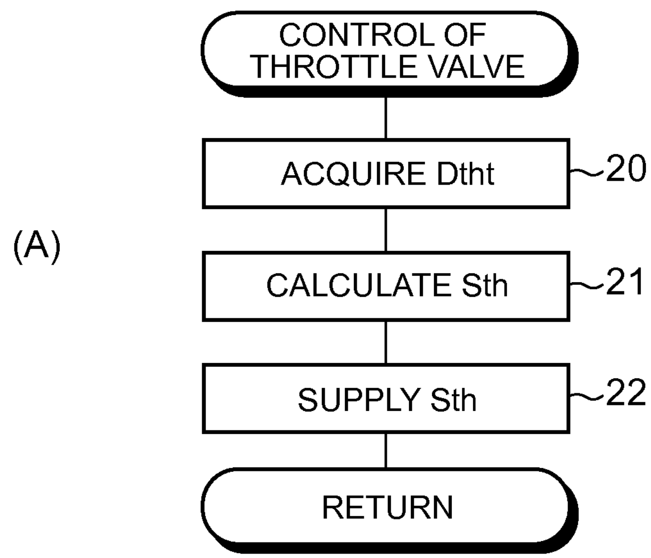
FIG. 5(A) is a view showing an example of a routine for performing the control of a throttle valve according to the first embodiment of the invention.
FIG. 5(B) is a view showing an example of a routine for setting a target throttle valve opening degree according to the first embodiment of the invention.
Figure 5:
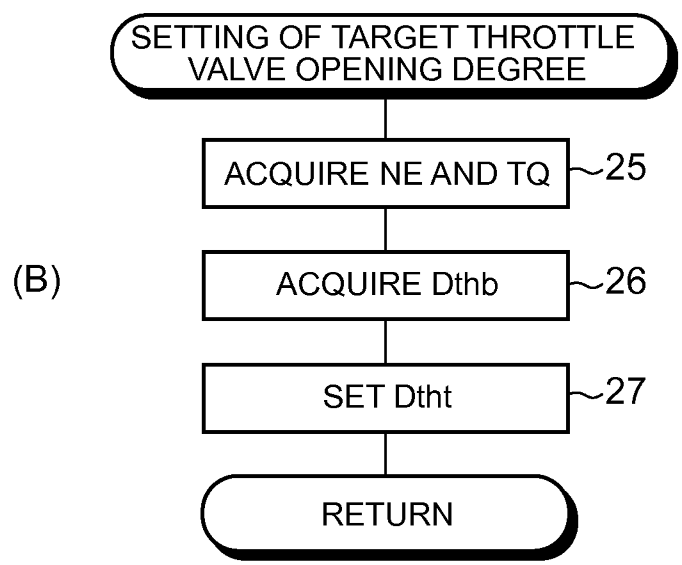

Next, an example of a routine for performing the control of the throttle valve according to the first embodiment of the invention will be described. The example of this routine is shown in FIG. 5(A). Incidentally, this routine is a routine that is started every time a predetermined crank angle is reached. If the routine of FIG. 5(A) is started, first of all in step 20, a latest target throttle valve opening degree Dtht that is set in a routine of FIG. 5(B) (the details of this routine will be described later) is acquired. Subsequently in step 21, a control signal Sth that should be supplied to the throttle valve is calculated on the basis of the target throttle valve opening degree Dtht acquired in step 20. Subsequently in step 22, the control signal Sth calculated in step 21 is supplied to the throttle valve, and them the routine ends.

Next, an example of a routine for setting the target throttle valve opening degree according to the first embodiment of the invention will be described. The example of this routine is shown in FIG. 5(B). Incidentally, this routine is a routine that is started every time a predetermined crank angle is reached. If the routine of FIG. 5(B) is started, first of all in step 25, the current engine rotational speed NE and the required engine torque TQ are acquired. Subsequently in step 26, the reference throttle valve opening degree Dthb corresponding to the engine rotational speed NE acquired in step 25 and the required engine torque TQ acquired in step 25 is acquired from the map of FIG. 3(B). Subsequently in step 27, the reference throttle valve opening degree Dthb acquired in step 26 is set as the target throttle valve opening degree Dtht, and then the routine ends.

Figure 6:
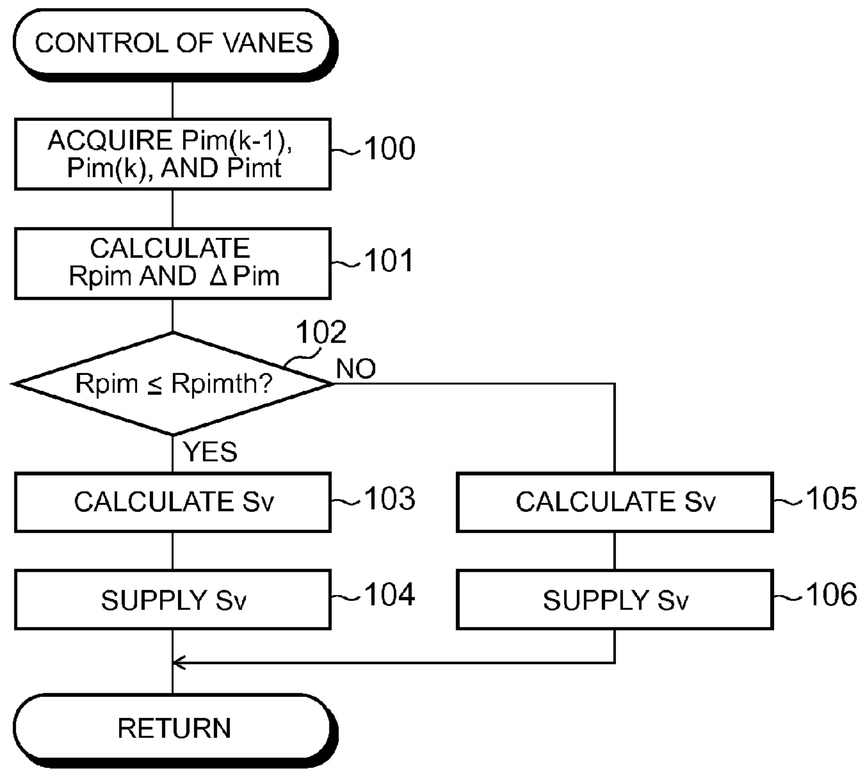
FIG. 6 is a view showing an example of a routine for performing the control of vanes according to the first embodiment of the invention.

Next, an example of a routine for performing the control of the vanes according to the first embodiment of the invention will be described. The example of this routine is shown in FIG. 6. Incidentally, this routine is a routine that is started every time a predetermined crank angle is reached.

If the routine of FIG. 6 is started, first of all in step 100, a boost pressure Pim(k−1) during the last execution of the present routine, a current boost pressure Pim(k), and a latest target boost pressure Pimt set in a routine of FIG. 7 (the details of this routine will be described later) are acquired. Subsequently in step 101, a change rate of the boost pressure (i.e., a boost pressure change rate) Rpim from the last execution of the present routine to the current execution of the present routine is calculated on the basis of the boost pressure Pim(k−1) during the last execution of the present routine, which is acquired in step 100, and the current boost pressure Pim(k) acquired in step 100, and a deviation of the current boost pressure from the target boost pressure (i.e., a boost pressure deviation) ΔPim is calculated on the basis of the current boost pressure Pim(k) acquired in step 100 and the target boost pressure Pimt acquired in step 100.

Subsequently in step 102, it is determined whether or not the boost pressure change rate Rpim calculated in step 101 is equal to or smaller than a predetermined boost pressure change rate Rpimth (Rpim≤Rpimth). If it is determined herein that Rpim≤Rpimth, the routine proceeds to step 103. On the other hand, if it is determined that Rpim>Rpimth, the routine proceeds to step 105.

In step 103, a control signal Sv that should be supplied to the vanes is calculated through single control using the boost pressure deviation ΔPim calculated in step 101 as input information. Subsequently in step 104, the control signal Sv calculated in step 103 is supplied to the vanes, and then the routine ends.

In step 105, the control signal Sv that should be supplied to the vanes is calculated through composite control using the boost pressure deviation ΔPim and the boost pressure change rate Rpim, which are calculated in step 101, as input information. Subsequently in step 106, the control signal Sv calculated in step 105 is supplied to the vanes, and then the routine ends.

Next, an example of a routine for setting the target boost pressure according to the first embodiment of the invention will be described. The example of this routine is shown in FIG. 7. Incidentally, this routine is a routine that is started every time a predetermined crank angle is reached. If the routine of FIG. 7 is started, first of all in step 30, the current engine rotational speed NE and the required engine torque TQ are acquired. Subsequently in step 31, the reference boost pressure Pimb corresponding to the engine rotational speed NE acquired in step 30 and the required engine torque TQ acquired in step 30 is acquired from the map of FIG. 3(C). Subsequently in step 32, the reference boost pressure Pimb acquired in step 31 is set as the target boost pressure Pimt, and then the routine ends.

Next, the second embodiment of the invention will be described. Incidentally, the configuration and control of the second embodiment of the invention that will not be described hereinafter are identical to the configuration and control of the first embodiment of the invention, or are a configuration and control that are derived as a matter of course from the configuration and control of the first embodiment of the invention in view of the configuration and control of the second embodiment of the invention that will be described hereinafter.

In the second embodiment of the invention, when the control of the boost pressure is changed over from single control according to the aforementioned first embodiment of the invention to composite control according to the aforementioned first embodiment of the invention, composite control is started using a disturbance on the control of the boost pressure resulting from a change in the boost pressure at the time when the boost pressure has reached a stable equilibrium state through the control of the boost pressure by composite control, as an initial value of the disturbance in the composite control.

Incidentally, the aforementioned stable equilibrium state means a state in which the change rate of the boost pressure that is controlled through the control of the boost pressure by composite control has become extremely small, in other words, a state in which the boost pressure that is controlled through the control of the boost pressure by composite control has reached a specific value.

According to the second embodiment of the invention, the following effects are obtained. That is, when the control of the boost pressure is changed over from single control to composite control, the control of the boost pressure is changed over from the control that does not consider the change in the boost pressure that acts as a disturbance on the control of the boost pressure to the control that considers the change in the boost pressure that acts as a disturbance on the control of the boost pressure. That is, the mode of the control of the boost pressure relatively greatly changes. Then, at this time, the stability of composite control becomes low. On the other hand, when the boost pressure has reached the stable equilibrium state through the control of the boost pressure by composite control, the stability of composite control is high. It should be noted herein that in the second embodiment of the invention, when the control of the boost pressure is changed over from single control to composite control, composite control is started using a disturbance on the control of the boost pressure resulting from the change in the boost pressure at the time when the boost pressure has reached the stable equilibrium state through the control of the boost pressure by the composite control, as an initial value of the disturbance of the composite control. That is, in the second embodiment of the invention, the composite control is started using a disturbance at the time when the stability of composite control is high, as an initial value of the disturbance in the composite control. In consequence, according to the second embodiment of the invention, an effect of making it possible to hold the stability of composite control high at a time point when the composite control is started is obtained.

Figure 8:
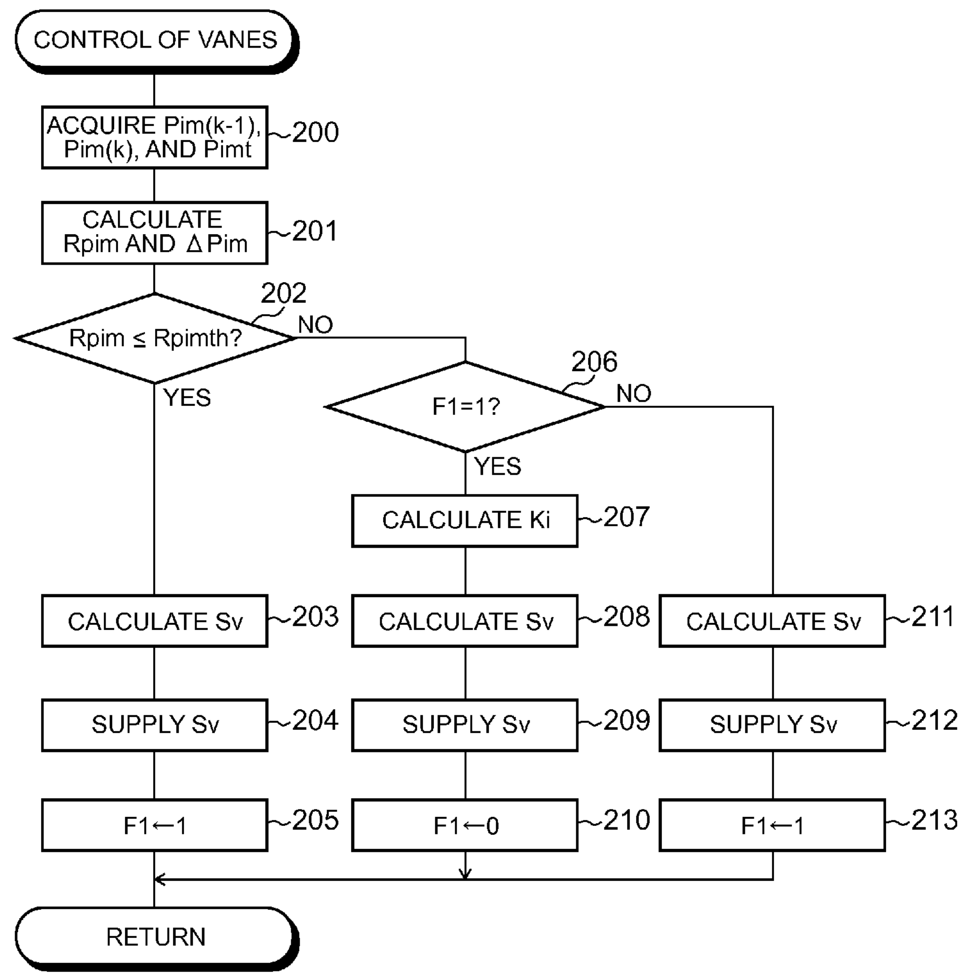
FIG. 8 is a view showing an example of a routine for performing the control of vanes according to a second embodiment of the invention.

Next, an example of a routine for performing the control of the vanes according to the second embodiment of the invention will be described. The example of this routine is shown in FIG. 8. Incidentally, this routine is a routine that is started every time a predetermined crank angle is reached.

Figure 7:
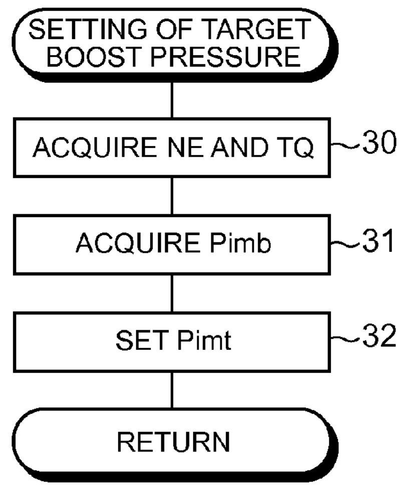
FIG. 7 is a view showing an example of a routine for setting a target boost pressure according to the first embodiment of the invention.

If the routine of FIG. 8 is started, first of all in step 200, the boost pressure Pim(k−1) during the last execution of the present routine, the current boost pressure Pim(k), and the latest target boost pressure Pimt set in the routine of FIG. 7 are acquired. Subsequently in step 201, the change rate of the boost pressure (i.e., the boost pressure change rate) Rpim from the last execution of the present routine to the current execution of the present routine is calculated on the basis of the boost pressure Pim(k−1) during the last execution of the present routine and the current boost pressure Pim(k), which are acquired in step 200, and the deviation of the current boost pressure from the target boost pressure (i.e., the boost pressure deviation) ΔPim is calculated on the basis of the current boost pressure Pim(k) and the target boost pressure Pimt, which are acquired in step 200.

Subsequently in step 202, it is determined whether or not the boost pressure change rate Rpim calculated in step 201 is equal to or smaller than the predetermined boost pressure change rate Rpimth (Rpim≤Rpimth). If it is determined herein that Rpim≤Rpimth, the routine proceeds to step 203. On the other hand, if it is determined that Rpim>Rpimth, the routine proceeds to step 206.

In step 203, the control signal Sv that should be supplied to the vanes is calculated through single control using the boost pressure deviation ΔPim calculated in step 201 as input information. Subsequently in step 204, the control signal Sv calculated in step 203 is supplied to the vanes. Subsequently in step 205, a composite control start flag F1 is set (F1←1), and then the routine ends. Incidentally, the composite control start flag F1 is a flag that is set as soon as the control of the boost pressure is changed over from single control to composite control, and is reset after composite control is started.

In step 206, it is determined whether or not the composite control start flag F1 is set (F1=1). If it is determined herein that F1=1, the routine proceeds to step 207. On the other hand, if it is determined that F1≠1, the routine proceeds to step 211.

In step 207, a disturbance Ki for the control of the boost pressure resulting from the change in the boost pressure at the time when the boost pressure has reached the stable equilibrium state through the control of the boost pressure by composite control is calculated. Subsequently in step 208, the control signal Sv that should be supplied to the vanes is calculated through composite control using the boost pressure deviation ΔPim and the boost pressure change rate Rpim, which are calculated in step 201, and the disturbance Ki calculated in step 207, as input information. Subsequently in step 209, the control signal Sv calculated in step 208 is supplied to the vanes. Subsequently in step 210, the composite control start flag F1 is reset, and then the routine ends.

In step 211, the control signal Sv that should be supplied to the vanes is calculated through composite control, using the boost pressure deviation ΔPim and the boost pressure change rate Rpim, which are calculated in step 201, as input information. Subsequently in step 212, the control signal Sv calculated in step 211 is supplied to the vanes. Subsequently in step 213, the composite control start flag F1 is set, and then the routine ends.

Next, the third embodiment of the invention will be described. Incidentally, the configuration and control of the third embodiment of the invention that will not be described hereinafter are identical to the configuration and control of each of the aforementioned embodiments of the invention, or are a configuration and control that are derived as a matter of course from the configuration and control of each of the aforementioned embodiments of the invention in view of the configuration and control of the third embodiment of the invention that will be described hereinafter.

In the third embodiment of the invention, a controller (this controller will be referred to hereinafter as "a composite controller") is prepared. A boost pressure deviation and an amount of change in the fuel injection amount per unit time (this amount of change will be referred to hereinafter as "a fuel injection amount change rate") are input to the composite controller as pieces of input information. The composite controller is designed to generate a control signal for driving the vanes such that the boost pressure approaches a target boost pressure with desired tracking properties, on the basis of these pieces of input information. Furthermore, a controller (this controller will be referred to hereinafter as "a single controller) is prepared. The fuel injection amount change rate is not input to the single controller as input information, and the boost pressure deviation is input to the single controller as input information. The single controller is designed to generate a control signal for driving the vanes such that the boost pressure approaches the target boost pressure with desired tracking properties, on the basis of this input information. In addition, composite control for controlling the boost pressure to the target boost pressure by supplying the vanes with the control signal generated through the use of the aforementioned composite controller, and single control for controlling the boost pressure to the target boost pressure by supplying the vanes with the control signal generated through the use of the aforementioned single controller can be selectively performed.

Then, during engine operation, if the absolute value of the fuel injection amount change rate is equal to or smaller than a predetermined fuel injection amount change rate, the boost pressure is controlled to the target boost pressure through the aforementioned single control. On the other hand, during engine operation, if the absolute value of the fuel injection amount change rate is larger than the aforementioned predetermined fuel injection amount change rate, the boost pressure is controlled to the target boost pressure through the aforementioned composite control.

According to the third embodiment of the invention, the following effects are obtained. That is, since the amount of combustion in the combustion chambers increases as the fuel injection amount increases, the pressure of exhaust gas discharged from the combustion chambers tends to rise as the fuel injection amount increases. In addition, since the amount of energy imparted to the vanes from exhaust gas increases as the pressure of exhaust gas discharged from the combustion chambers rises, the degree of compression of gas by the compressor is large. As a matter of course, since the amount of combustion in the combustion chambers decreases as the fuel injection amount decreases, the pressure of exhaust gas discharged from the combustion chambers tends to fall as the fuel injection amount increases. In addition, since the amount of energy imparted to the vanes from exhaust gas decreases as the pressure of exhaust gas discharged from the combustion chambers falls, the degree of compression of gas by the compressor is small.

That is, the degree of compression of gas by the compressor changes in accordance with the fuel injection amount. Accordingly, when the change in the fuel injection amount is relatively large, the degree to which the change in the fuel injection amount acts as a disturbance on the control of the boost pressure is relatively large. Accordingly, when the change in the fuel injection amount is relatively large, the possibility of the occurrence of an overshoot of the boost pressure or an undershoot of the boost pressure is high. Accordingly, from the standpoint of suppressing this overshoot of the boost pressure or this undershoot of the boost pressure, it is preferable to cause the control of the boost pressure to reflect the change in the fuel injection amount when the change in the fuel injection amount is relatively large. On the other hand, when the change in the fuel injection amount is relatively small, the degree to which the change in the fuel injection amount acts as a disturbance on the control of the boost pressure is relatively small. Accordingly, when the change in the fuel injection amount is relatively small, the possibility of the occurrence of an overshoot of the boost pressure or an undershoot of the boost pressure is low. Accordingly, when the change in the fuel injection amount is relatively small, there is little need to cause the control of the boost pressure to reflect the change in the fuel injection amount, from the standpoint of suppressing an overshoot of the boost pressure or an undershoot of the boost pressure.

It should be noted herein that in the third embodiment of the invention, when the absolute value of the fuel injection amount change rate is larger than a predetermined fuel injection amount change rate, the boost pressure is controlled to a target boost pressure through composite control. It should be noted herein that composite control according to the third embodiment of the invention is the control designed to control the boost pressure to the target boost pressure in consideration of the change in the fuel injection amount that acts as a disturbance on the control of the boost pressure. That is, in the third embodiment of the invention, when the absolute value of the fuel injection amount change rate is larger than the predetermined fuel injection amount change rate and hence the degree to which the change in the fuel injection amount acts as a disturbance on the control of the boost pressure is relatively large, the boost pressure is controlled to the target boost pressure in consideration of the change in the fuel injection amount.

Thus, even when the degree to which the change in the fuel injection amount acts as a disturbance on the control of the boost pressure is relatively large, an effect of making it possible to suppress an overshoot of the boost pressure or an undershoot of the boost pressure is obtained.

Incidentally, single control according to the third embodiment of the invention, namely, the control designed to control the boost pressure to the target boost pressure without considering the change in the fuel injection amount that acts as a disturbance on the control of the boost pressure is used to control the boost pressure when the absolute value of the fuel injection amount change rate is equal to or smaller than the predetermined fuel injection amount change rate. That is, single control according to the third embodiment of the invention is used to control the boost pressure when the degree to which the change in the fuel injection amount acts as a disturbance on the control of the boost pressure is relatively small. Accordingly, in this case, even if single control is used to control the boost pressure, an overshoot of the boost pressure or an undershoot of the boost pressure is suppressed.

Furthermore, since single control is the control of the boost pressure that does not consider the change in the fuel injection amount that acts as a disturbance on the control of the boost pressure, the load that is applied to the electronic control unit to perform this single control is relatively small. Accordingly, when single control is used to control the boost pressure, an effect of performing the control of the boost pressure with small load while suppressing an overshoot of the boost pressure or an undershoot of the boost pressure as described above is obtained.

Figure 9:
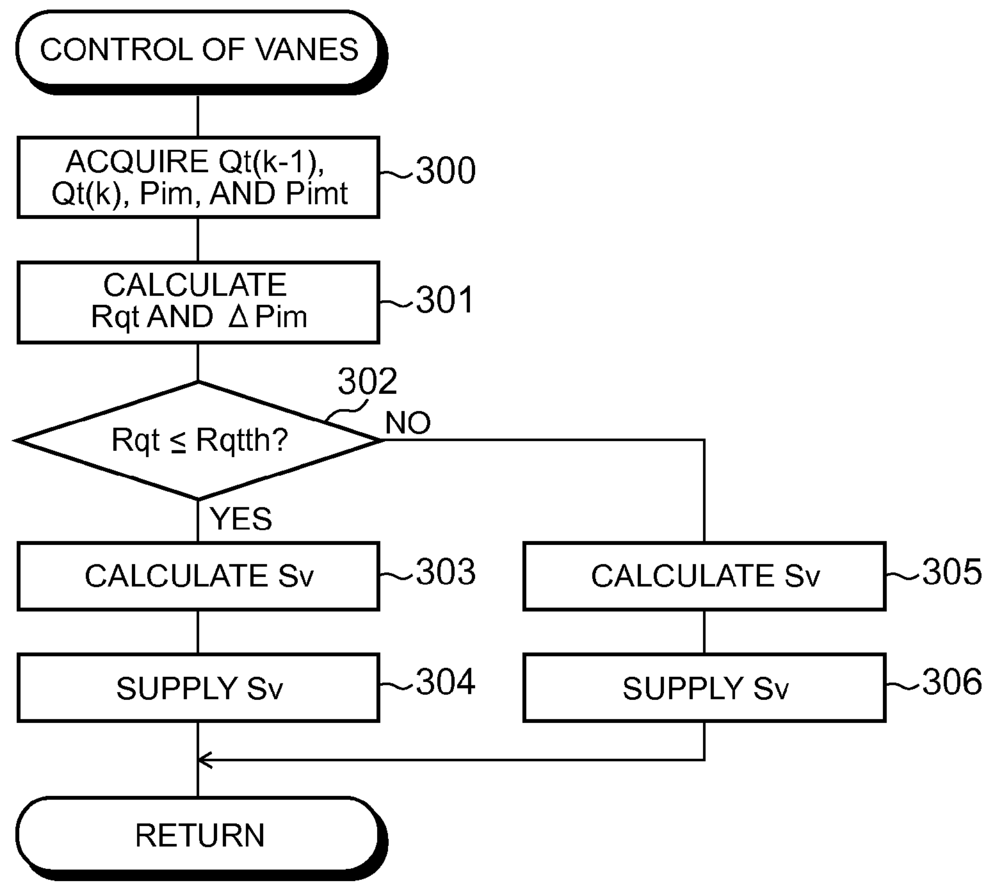
FIG. 9 is a view showing an example of a routine for performing the control of vanes according to a third embodiment of the invention.

Next, an example of a routine for performing the control of the vanes according to the third embodiment of the invention will be described. The example of this routine is shown in FIG. 9. Incidentally, this routine is a routine that is started every time a predetermined crank angle is reached.

If the routine of FIG. 9 is started, first of all in step 300, a target fuel injection amount Qt(k−1) during the last execution of the present routine, a current target fuel injection amount Qt(k), a current boost pressure Pim, and the latest target boost pressure Pimt set in the routine of FIG. 7 (the details of this routine will be described later) are acquired. Subsequently in step 301, a change rate of the fuel injection amount (i.e., a fuel injection amount change rate) Rqt from the last execution of the present routine to the current execution of the present routine is calculated on the basis of the target fuel injection amount Qt(k−1) during the last execution of the present routine and the current target fuel injection amount Qt(k), which are acquired in step 300, and a deviation of the current boost pressure from the target boost pressure (i.e., a boost pressure deviation) ΔPim is calculated on the basis of the current boost pressure Pim and the target boost pressure Pimt, which are acquired in step 300.

Subsequently in step 302, it is determined whether or not the fuel injection amount change rate Rqt calculated in step 301 is equal to or smaller than a predetermined fuel injection amount change rate Rqtth (Rqt≤Rqtth). If it is determined herein that Rqt≤Rqtth, the routine proceeds to step 303. On the other hand, if it is determined that Rqt>Rqtth, the routine proceeds to step 305.

In step 303, the control signal Sv that should be supplied to the vanes is calculated through single control, using the boost pressure deviation ΔPim calculated in step 301, as input information. Subsequently in step 304, the control signal Sv calculated in step 303 is supplied to the vanes, and then the routine ends.

In step 305, the control signal Sv that should be supplied to the vanes is calculated through composite control, using the boost pressure deviation ΔPim calculated in step 301 and the fuel injection amount change rate Rqt calculated in step 301, as input information. Subsequently in step 306, the control signal Sv calculated in step 305 is supplied to the vanes, and then the routine ends.

Next, the fourth embodiment of the invention will be described. Incidentally, the configuration and control of the fourth embodiment of the invention that will not be described hereinafter are identical to the configuration and control of each of the aforementioned embodiments of the invention, or are a configuration and control that are derived as a matter of course from the configuration and control of each of the aforementioned embodiments of the invention in view of the configuration and control of the fourth embodiment of the invention that will be described hereinafter.

In the fourth embodiment of the invention, when the control of the boost pressure is changed over from single control according to the aforementioned third embodiment of the invention to composite control according to the aforementioned third embodiment of the invention, composite control is started using a disturbance on the control of the boost pressure resulting from the change in the fuel injection amount at the time when the boost pressure has reached a stable equilibrium state through the control of the boost pressure by the composite control, as an initial value of the disturbance in the composite control.

According to the fourth embodiment of the invention, the following effects are obtained. That is, when the control of the boost pressure is changed over from single control to composite control, the control of the boost pressure is changed over from the control that does not consider the change in the fuel injection amount that acts as a disturbance on the control of the boost pressure to the control that considers the change in the fuel injection amount that acts as a disturbance on the control of the boost pressure. That is, the mode of the control of the boost pressure relatively greatly changes. Then, at this time, the stability of composite control becomes low. On the other hand, when the boost pressure has reached the stable equilibrium state through the control of the boost pressure by composite control, the stability of composite control is high. It should be noted herein that in the fourth embodiment of the invention, when the control of the boost pressure is changed over from single control to composite control, composite control is started using a disturbance on the control of the boost pressure resulting from the change in the fuel injection amount at the time when the boost pressure has reached the stable equilibrium state through the control of the boost pressure by the composite control, as an initial value of the disturbance of the composite control. That is, in the fourth embodiment of the invention, the composite control is started using a disturbance at the time when the stability of composite control is high, as an initial value of the disturbance in the composite control. In consequence, according to the fourth embodiment of the invention, an effect of making it possible to hold the stability of composite control high at a time point when the composite control is started is obtained.

Figure 10:
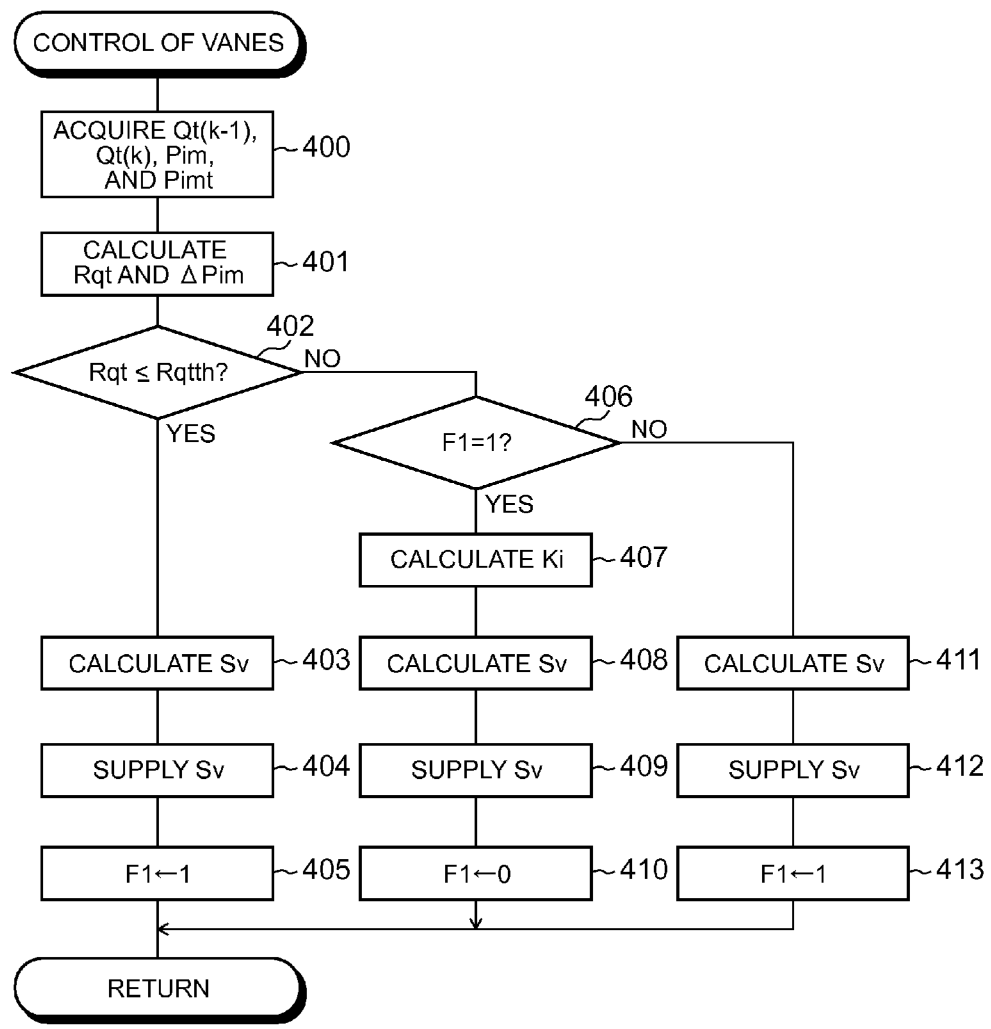
FIG. 10 is a view showing an example of a routine for performing the control of vanes according to a fourth embodiment of the invention.

Next, an example of a routine for performing the control of the vanes according to the fourth embodiment of the invention will be described. The example of this routine is shown in FIG. 10. Incidentally, this routine is a routine that is started every time a predetermined crank angle is reached.

If the routine of FIG. 10 is started, first of all in step 400, the target fuel injection amount Qt(k−1) during the last execution of the present routine, the current target fuel injection amount Qt(k), the current boost pressure Pim, and the latest target boost pressure Pimt set in the routine of FIG. 7 are acquired. Subsequently in step 401, the change rate of the fuel injection amount (i.e., the fuel injection amount change rate) Rqt from the last execution of the present routine to the current execution of the present routine is calculated on the basis of the target fuel injection amount Qt(k−1) during the last execution of the present routine and the current target fuel injection amount Qt(k), which are acquired in step 400, and a deviation of the current boost pressure from the target boost pressure (i.e., the boost pressure deviation) ΔPim is calculated on the basis of the current boost pressure Pim and the target boost pressure Pimt, which are acquired in step 400.

Subsequently in step 402, it is determined whether or not the fuel injection amount change rate Rqt calculated in step 401 is equal to or smaller than the predetermined fuel injection amount change rate Rqtth (Rqt≤Rqtth). If it is determined herein that Rqt≤Rqtth, the routine proceeds to step 403. On the other hand, if it is determined that Rqt>Rqtth, the routine proceeds to step 406.

In step 403, the control signal Sv that should be supplied to the vanes is calculated through single control, using the boost pressure deviation ΔPim calculated in step 401, as input information. Subsequently in step 404, the control signal Sv calculated in step 403 is supplied to the vanes. Subsequently in step 405, the composite control start flag F1 is set (F1←1), and then the routine ends. Incidentally, the composite control start flag F1 is a flag that is set as soon as the control of the boost pressure is changed over from single control to composite control, and is reset after composite control is started.

In step 406, it is determined whether or not the composite control start flag F1 is set (F1=1). If it is determined herein that F1=1, the routine proceeds to step 407. On the other hand, if it is determined that F1≠1, the routine proceeds to step 411.

In step 407, the disturbance Ki for the control of the boost pressure resulting from the change in the boost pressure at the time when the boost pressure has reached the stable equilibrium state through the control of the boost pressure by composite control is calculated. Subsequently in step 408, the control signal Sv that should be supplied to the vanes is calculated through composite control using the boost pressure deviation ΔPim and the fuel injection amount change rate Rqt, which are calculated in step 401, and the disturbance Ki calculated in step 407, as input information. Subsequently in step 409, the control signal Sv calculated in step 408 is supplied to the vanes. Subsequently in step 410, the composite control start flag F1 is reset, and then the routine ends.

In step 411, the control signal Sv that should be supplied to the vanes is calculated through composite control, using the boost pressure deviation ΔPim and the fuel injection amount change rate Rqt, which are calculated in step 401, as input information. Subsequently in step 412, the control signal Sv calculated in step 411 is supplied to the vanes. Subsequently in step 413, the composite control start flag F1 is set, and then the routine ends.

Next, the fifth embodiment of the invention will be described. Incidentally, the configuration and control of the fifth embodiment of the invention that will not be described hereinafter are identical to the configuration and control of each of the aforementioned embodiments of the invention, or are a configuration and control that are derived as a matter of course from the configuration and control of each of the aforementioned embodiments of the invention in view of the configuration and control of the fifth embodiment of the invention that will be described hereinafter.

In the fifth embodiment of the invention, a controller (this controller will be referred to hereinafter as "a composite controller") is prepared. A boost pressure deviation, a fuel injection amount change rate, and a boost pressure change rate are input to the composite controller as pieces of input information. The composite controller is designed to generate a control signal for driving the vanes such that the boost pressure approaches a target boost pressure with desired tracking properties, on the basis of these pieces of input information. Furthermore, a controller (this controller will be referred to hereinafter as "a single controller) is prepared. The fuel injection amount change rate and the boost pressure change rate are not input to the single controller as input information, and the boost pressure deviation is input to the single controller as input information. The single controller is designed to generate a control signal for driving the vanes such that the boost pressure approaches the target boost pressure with desired tracking properties, on the basis of this input information. In addition, composite control for controlling the boost pressure to the target boost pressure by supplying the vanes with the control signal generated through the use of the aforementioned composite controller, and single control for controlling the boost pressure to the target boost pressure by supplying the vanes with the control signal generated through the use of the aforementioned single controller can be selectively performed.

Then, during engine operation, when the absolute value of the fuel injection amount change rate is equal to or smaller than a predetermined fuel injection amount change rate and the absolute value of the boost pressure change rate is equal to or smaller than a predetermined boost pressure change rate, the boost pressure is controlled to the target boost pressure through the aforementioned single control. On the other hand, during engine operation, at least when the absolute value of the fuel injection amount change rate is larger than the aforementioned predetermined fuel injection amount change rate or the absolute value of the boost pressure change rate is larger than the aforementioned predetermined boost pressure change rate, the boost pressure is controlled to the target boost pressure through the aforementioned composite control.

According to the fifth embodiment of the invention, the following effects are obtained. That is, as described above, the degree of compression of gas by the compressor changes in accordance with the fuel injection amount. Accordingly, from the standpoint of suppressing an overshoot of the boost pressure or an undershoot of the boost pressure, it is preferable to cause the control of the boost pressure to reflect the change in the fuel injection amount when the change in the fuel injection amount is relatively large. On the other hand, when the change in the fuel injection amount is relatively small, there is little need to cause the control of the boost pressure to reflect the change in the fuel injection amount, from the standpoint of suppressing an overshoot of the boost pressure or an undershoot of the boost pressure.

Besides, as described above, when the change in the boost pressure is relatively large, the degree to which the change in the boost pressure acts as a disturbance on the control of the boost pressure is relatively large. Accordingly, from the standpoint of suppressing an overshoot of the boost pressure or an undershoot of the boost pressure, it is preferable to cause the control of the boost pressure to reflect the change in the boost pressure when the change in the boost pressure is relatively large. On the other hand, when the change in the boost pressure is relatively small, there is little need to cause the control of the boost pressure to reflect the change in the boost pressure, from the standpoint of suppressing an overshoot of the boost pressure or an undershoot of the boost pressure.

It should be noted herein that in the fifth embodiment of the invention, at least when the absolute value of the fuel injection amount change rate is larger than a predetermined fuel injection amount change rate or the absolute value of the boost pressure change rate is larger than a predetermined boost pressure change rate, the boost pressure is controlled to a target boost pressure through composite control. It should be noted herein that composite control according to the fifth embodiment of the invention is the control designed to control the boost pressure to the target boost pressure in consideration of the change in the fuel injection amount and the change in the boost pressure that act as a disturbance on the control of the boost pressure. That is, in the fifth embodiment of the invention, when the absolute value of the fuel injection amount change rate is larger than the predetermined fuel injection amount change rate and hence the degree to which the change in the fuel injection amount acts as a disturbance on the control of the boost pressure is relatively large, the boost pressure is controlled to the target boost pressure in consideration of the change in the fuel injection amount. When the absolute value of the boost pressure change rate is larger than the predetermined boost pressure change rate and hence the degree to which the change in the boost pressure acts as a disturbance on the control of the boost pressure is relatively large, the boost pressure is controlled to the target boost pressure in consideration of the change in the boost pressure.

Thus, even when the degree to which the change in the fuel injection amount acts as a disturbance on the control of the boost pressure is relatively large, or even when the degree to which the change in the boost pressure acts as a disturbance on the control of the boost pressure is relatively large, an effect of making it possible to suppress an overshoot of the boost pressure or an undershoot of the boost pressure is obtained.

Incidentally, single control according to the fifth embodiment of the invention, namely, the control designed to control the boost pressure to the target boost pressure without considering the change in the fuel injection amount and the change in the boost pressure that act as a disturbance on the control of the boost pressure is used to control the boost pressure when the absolute value of the fuel injection amount change rate is equal to or smaller than the predetermined fuel injection amount change rate and the absolute value of the boost pressure change rate is equal to or smaller than the predetermined boost pressure change rate. That is, single control according to the fifth embodiment of the invention is used to control the boost pressure when the degree to which the change in the fuel injection amount and the change in the boost pressure act as a disturbance on the control of the boost pressure is relatively small. Accordingly, in this case, even if single control is used to control the boost pressure, an overshoot of the boost pressure or an undershoot of the boost pressure is suppressed.

Furthermore, since single control is the control of the boost pressure that does not consider the change in the fuel injection amount and the change in the boost pressure that act as a disturbance on the control of the boost pressure, the load that is applied to the electronic control unit to perform this single control is relatively small. Accordingly, when single control is used to control the boost pressure, an effect of performing the control of the boost pressure with small load while suppressing an overshoot of the boost pressure or an undershoot of the boost pressure as described above is obtained.

Figure 11:
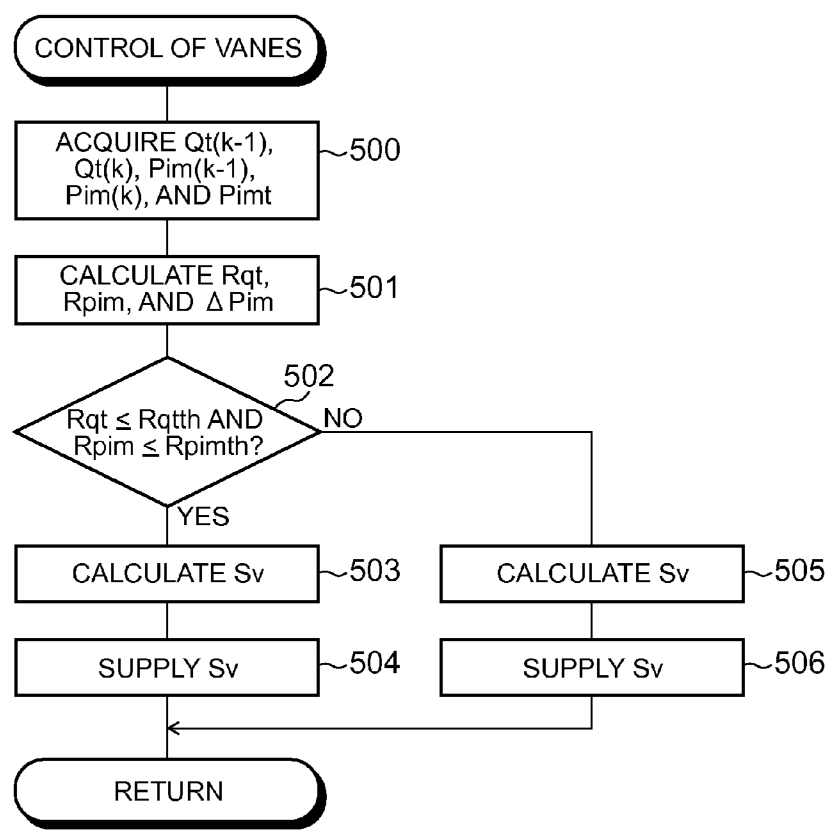
FIG. 11 is a view showing an example of a routine for performing the control of vanes according to a fifth embodiment of the invention.

Next, an example of a routine for performing the control of the vanes according to the fifth embodiment of the invention will be described. The example of this routine is shown in FIG. 11. Incidentally, this routine is a routine that is started every time a predetermined crank angle is reached.

If the routine of FIG. 11 is started, first of all in step 500, the target fuel injection amount Qt(k−1) during the last execution of the present routine, the current target fuel injection amount Qt(k), the boost pressure Pim(k−1) during the last execution of the present routine, the current boost pressure Pim(k), and the latest target boost pressure Pimt set in the routine of FIG. 7 (the details of this routine will be described later) are acquired. Subsequently in step 501, the change rate of the fuel injection amount (i.e., the fuel injection amount change rate) Rqt from the last execution of the present routine to the current execution of the present routine is calculated on the basis of the target fuel injection amount Qt(k−1) during the last execution of the present routine and the current target fuel injection amount Qt(k), which are acquired in step 500, and the change rate of the boost pressure (i.e., the boost pressure change rate) Rpim from the last execution of the present routine to the current execution of the present routine is calculated on the basis of the boost pressure Pim(k−1) during the last execution of the present routine and the current boost pressure Pim(k), which are acquired in step 500. Also, a deviation of the current boost pressure from the target boost pressure (i.e., the boost pressure deviation) ΔPim is calculated on the basis of the current boost pressure Pim(k) and the target boost pressure Pimt, which are acquired in step 500.

Subsequently in step 502, it is determined whether or not the fuel injection amount change rate Rqt calculated in step 501 is equal to or smaller than the predetermined fuel injection amount change rate Rqtth (Rqt≤Rqtth) and the boost pressure change rate Rpim calculated in step 501 is equal to or smaller than the boost pressure change rate Rpimth (Rpim≤Rpimth). If it is determined herein that Rqt≤Rqtth and Rpim≤Rpimth, the routine proceeds to step 503. On the other hand, if it is determined that Rqt>Rqtth or Rpim>Rpimth, the routine proceeds to step 505.

In step 503, the control signal Sv that should be supplied to the vanes is calculated through single control, using the boost pressure deviation ΔPim calculated in step 501 as input information. Subsequently in step 504, the control signal Sv calculated in step 503 is supplied to the vanes, and then the routine ends.

In step 505, the control signal Sv that should be supplied to the vanes is calculated through composite control, using the boost pressure deviation ΔPim, the fuel injection amount change rate Rqt, and the boost pressure change rate Rpim, which are calculated in step 501, as input information. Subsequently in step 506, the control signal Sv calculated in step 505 is supplied to the vanes, and then the routine ends.

Next, the sixth embodiment of the invention will be described. Incidentally, the configuration and control of the sixth embodiment of the invention that will not be described hereinafter are identical to the configuration and control of each of the aforementioned embodiments of the invention, or are a configuration and control that are derived as a matter of course from the configuration and control of each of the aforementioned embodiments of the invention in view of the configuration and control of the sixth embodiment of the invention that will be described hereinafter.

In the sixth embodiment of the invention, when the control of the boost pressure is changed over from single control according to the aforementioned fifth embodiment of the invention to composite control according to the aforementioned fifth embodiment of the invention, composite control is started using a disturbance on the control of the boost pressure resulting from the change in the fuel injection amount and the change in the boost pressure at the time when the boost pressure has reached the stable equilibrium state through the control of the boost pressure by the composite control, as an initial value of the disturbance in the composite control.

According to the sixth embodiment of the invention, the following effects are obtained. That is, when the control of the boost pressure is changed over from single control to composite control, the control of the boost pressure is changed over from the control that does not consider the change in the fuel injection amount and the change in the boost pressure that act as a disturbance on the control of the boost pressure to the control that considers the change in the fuel injection amount and the change in the boost pressure that act as a disturbance on the control of the boost pressure. That is, the mode of the control of the boost pressure relatively greatly changes. Then, at this time, the stability of composite control becomes low. On the other hand, when the boost pressure has reached the stable equilibrium state through the control of the boost pressure by composite control, the stability of composite control is high. It should be noted herein that in the sixth embodiment of the invention, when the control of the boost pressure is changed over from single control to composite control, composite control is started using a disturbance on the control of the boost pressure resulting from the change in the fuel injection amount and the change in the boost pressure at the time when the boost pressure has reached the stable equilibrium state through the control of the boost pressure by the composite control, as an initial value of the disturbance of the composite control. That is, in the sixth embodiment of the invention, the composite control is started using a disturbance at the time when the stability of composite control is high, as an initial value of the disturbance in the composite control. In consequence, according to the sixth embodiment of the invention, an effect of making it possible to hold the stability of composite control high at a time point when the composite control is started is obtained.

Figure 12:
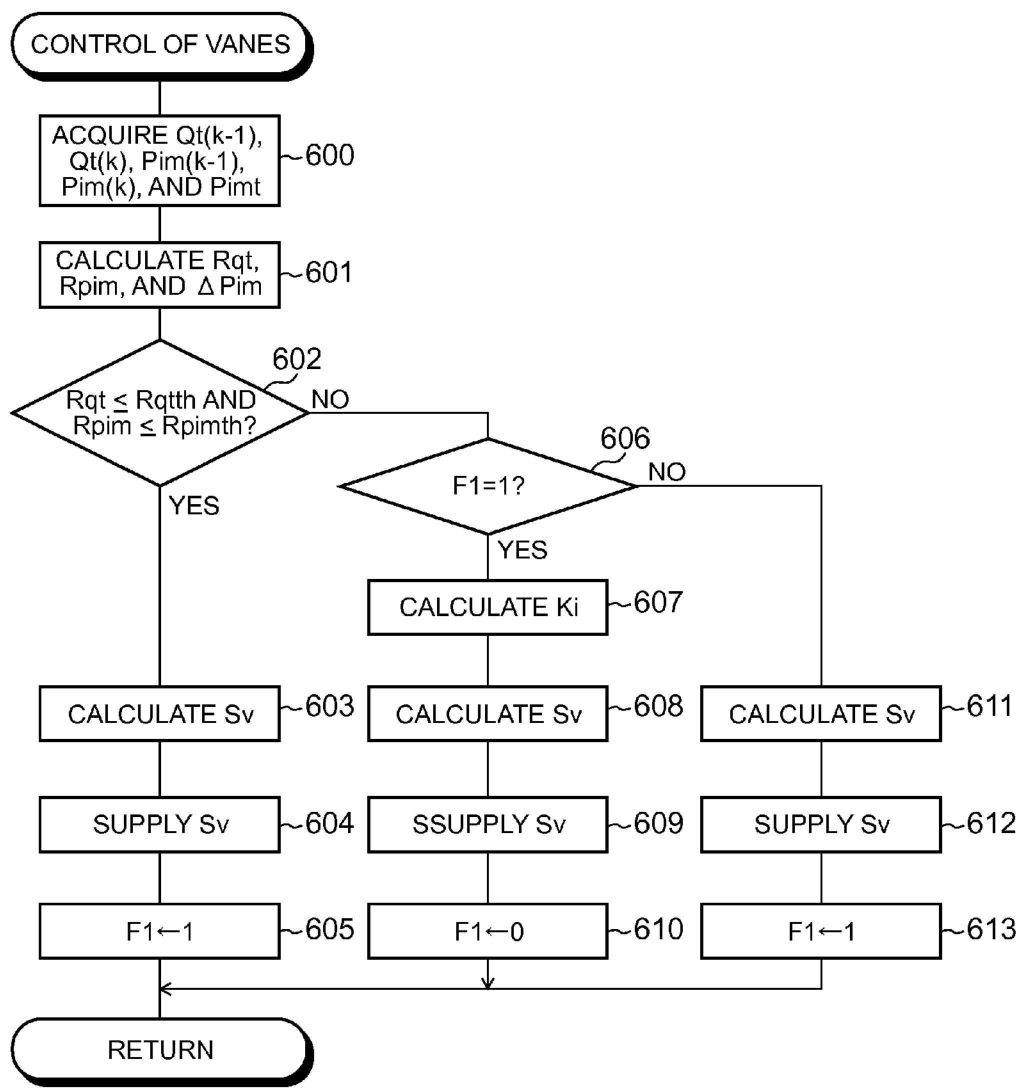
FIG. 12 is a view showing an example of a routine for performing the control of vanes according to a sixth embodiment of the invention.

Next, an example of a routine for performing the control of the vanes according to the sixth embodiment of the invention will be described. The example of this routine is shown in FIG. 12. Incidentally, this routine is a routine that is started every time a predetermined crank angle is reached.

If the routine of FIG. 12 is started, first of all in step 600, the target fuel injection amount Qt(k−1) during the last execution of the present routine, the current target fuel injection amount Qt(k), the boost pressure Pim(k−1) during the last execution of the present routine, the current boost pressure Pim(k), and the latest target boost pressure Pimt set in the routine of FIG. 7 (the details of this routine will be described later) are acquired. Subsequently in step 601, the change rate of the fuel injection amount (i.e., the fuel injection amount change rate) Rqt from the last execution of the present routine to the current execution of the present routine is calculated on the basis of the target fuel injection amount Qt(k−1) during the last execution of the present routine and the current target fuel injection amount Qt(k), which are acquired in step 600, and the change rate of the boost pressure (i.e., the boost pressure change rate) Rpim from the last execution of the present routine to the current execution of the present routine is calculated on the basis of the boost pressure Pim(k−1) during the last execution of the present routine and the current boost pressure Pim(k), which are acquired in step 600. Also, the deviation of the current boost pressure from the target boost pressure (i.e., the boost pressure deviation) ΔPim is calculated on the basis of the current boost pressure Pim(k) and the target boost pressure Pimt, which are acquired in step 600.

Subsequently in step 602, it is determined whether or not the fuel injection amount change rate Rqt calculated in step 601 is equal to or smaller than the predetermined fuel injection amount change rate Rqtth (Rqt≤Rqtth) and the boost pressure change rate Rpim calculated in step 601 is equal to or smaller than the predetermined boost pressure change rate Rpimth (Rpim≤Rpimth). If it is determined herein that Rqt≤Rqtth and Rpim≤Rpimth, the routine proceeds to step 603. On the other hand, if it is determined that Rqt>Rqtth or Rpim>Rpimth, the routine proceeds to step 606.

In step 603, the control signal Sv that should be supplied to the vanes is calculated through single control, using the boost pressure deviation ΔPim calculated in step 601, as input information. Subsequently in step 604, the control signal Sv calculated in step 603 is supplied to the vanes. Subsequently in step 605, the composite control start flag F1 is set (F1←1), and then the routine ends. Incidentally, the composite control start flag F1 is a flag that is set as soon as the control of the boost pressure is changed over from single control to composite control, and is reset after composite control is started.

In step 606, it is determined whether or not the composite control start flag F1 is set (F1=1). If it is determined herein that F1=1, the routine proceeds to step 607. On the other hand, if it is determined that F1≠1, the routine proceeds to step 611.

In step 607, the disturbance Ki for the control of the boost pressure resulting from the change in the boost pressure at the time when the boost pressure has reached the stable equilibrium state through the control of the boost pressure by composite control is calculated. Subsequently in step 608, the control signal Sv that should be supplied to the vanes is calculated through composite control using the boost pressure deviation ΔPim, the fuel injection amount change rate Rqt, and the boost pressure change rate Rpim, which are calculated in step 601, and the disturbance Ki calculated in step 607, as input information. Subsequently in step 609, the control signal Sv calculated in step 608 is supplied to the vanes. Subsequently in step 610, the composite control start flag F1 is reset, and then the routine ends.

In step 611, the control signal Sv that should be supplied to the vanes is calculated through composite control, using the boost pressure deviation ΔPim, the fuel injection amount change rate Rqt, and the boost pressure change rate Rpim, which are calculated in step 601, as input information. Subsequently in step 612, the control signal Sv calculated in step 611 is supplied to the vanes. Subsequently in step 613, the composite control start flag F1 is set, and then the routine ends.

Incidentally, in each of the aforementioned embodiments of the invention, the boost pressure deviation, the fuel injection amount change rate, and the boost pressure change rate are mentioned as the input information that is input to the composite controller. However, in addition to the boost pressure deviation, the fuel injection amount change rate, and the boost pressure change rate, parameters other than this boost pressure deviation, this fuel injection amount change rate, and this boost pressure change rate can also be adopted as the input information that is input to the composite controller. Besides, in each of the aforementioned embodiments of the invention, the boost pressure deviation is mentioned as the input information that is input to the single controller. However, in addition to the boost pressure deviation, parameters other than the boost pressure deviation, the fuel injection amount change rate, and the boost pressure change rate can also be adopted as the input information that is input to the single controller.

Besides, the composite controller according to each of the aforementioned embodiments of the invention may be any controller as long as it is a controller to which at least the boost pressure deviation, the fuel injection amount change rate, and the boost pressure change rate are input as input information and which generates a control signal for driving the vanes such that the boost pressure approaches the target boost pressure with desired tracking properties, on the basis of this boost pressure deviation, this fuel injection amount change rate, and this boost pressure change rate. Accordingly, as the composite controller according to each of the aforementioned embodiments of the invention, for example, a controller that generates the aforementioned control signal through the use of a physical model that expresses the behavior of the boost pressure using the boost pressure deviation, the fuel injection amount change rate, and the boost pressure change rate as input variables can be adopted. Alternatively, as the composite controller according to each of the aforementioned embodiments of the invention, for example, a controller that generates the aforementioned control signal through the use of a state equation that expresses the behavior of the boost pressure using the boost pressure deviation, the fuel injection amount change rate, and the boost pressure change rate as input variables can also be adopted.

Besides, the single controller according to each of the aforementioned embodiments of the invention may be any controller as long as it is a controller to which at least the fuel injection amount change rate and the boost pressure change rate are not input as input information and the boost pressure deviation is input as input information and which generates a control signal for driving the vanes such that the boost pressure approaches the target boost pressure with desired tracking properties on the basis of this boost pressure deviation. Accordingly, as the single controller according to each of the aforementioned embodiments of the invention, for example, a controller that generates the aforementioned control signal through the use of a physical model that expresses the behavior of the boost pressure using the boost pressure deviation as an input variable instead of using the fuel injection amount change rate and the boost pressure change rate as input variables can be adopted. Alternatively, as the single controller according to each of the aforementioned embodiments of the invention, for example, a controller that generates the aforementioned control signal through the use of a state equation that expresses the behavior of the boost pressure using the boost pressure deviation as an input variable instead of using the fuel injection amount change rate and the boost pressure change rate as input variables can also be adopted.

Besides, the degree of the influence of the change in the boost pressure on the control of the boost pressure, the degree of the influence of the change in the fuel injection amount on the control of the boost pressure, and the degree of the influence of the change in the fuel injection amount and the change in the boost pressure on the control of the boost pressure are larger when the engine rotational speed is high and the required engine torque is high than when the engine rotational speed is low or the required engine torque is low. Thus, in each of the aforementioned embodiments of the invention, a condition that the engine rotational speed be higher than a predetermined engine rotational speed and the required engine torque be higher than a predetermined required engine torque may be added as the condition for changing over the control of the boost pressure from single control to composite control. In this case, in the first embodiment of the invention and the second embodiment of the invention, the boost pressure is controlled to the target boost pressure through composite control when the absolute value of the boost pressure change rate is larger than the predetermined boost pressure change rate, the engine rotational speed is higher than the predetermined engine rotational speed, and the required engine torque is higher than the predetermined required engine torque. In the third embodiment of the invention and the fourth embodiment of the invention, the boost pressure is controlled to the target boost pressure through composite control when the absolute value of the fuel injection amount change rate is larger than a predetermined fuel injection amount change rate, the engine rotational speed is higher than the predetermined engine rotational speed, and the required engine torque is higher than the predetermined required engine torque. In the fifth embodiment of the invention and the sixth embodiment of the invention, the boost pressure is controlled to the target boost pressure through composite control when the absolute value of the fuel injection amount change rate is larger than the predetermined fuel injection amount change rate, the engine rotational speed is higher than the predetermined engine rotational speed, and the required engine torque is higher than the predetermined required engine torque, or when the absolute value of the boost pressure change rate is larger than the predetermined boost pressure change rate, the engine rotational speed is higher than the predetermined engine rotational speed, and the required engine torque is higher than the predetermined required engine torque.

Figure 13:
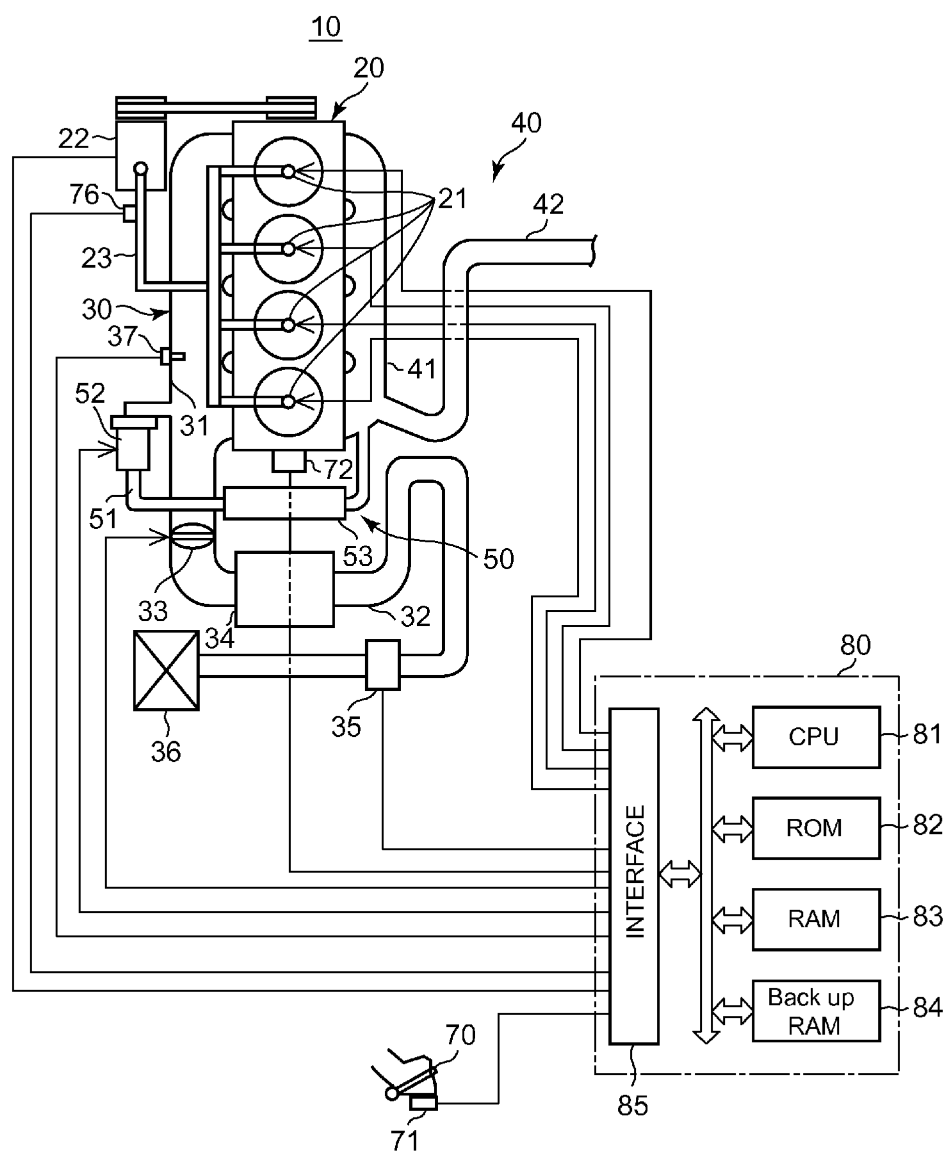
FIG. 13 is a view showing the internal combustion engine to which the control apparatus according to the invention is applied.

The idea about the changeover of the control of the boost pressure described in association with the first embodiment of the invention and the idea about the setting of the initial value of the disturbance described in association with the second embodiment of the invention can also be applied to the control of an EGR rate in an internal combustion engine shown in FIG. 13. An embodiment of the invention in this case (which will be referred to hereinafter as "the seventh embodiment of the invention") will be described hereinafter. Incidentally, the configuration and control according to the seventh embodiment of the invention that will not be described hereinafter are identical to the configurations and control of the first embodiment of the invention and the second embodiment of the invention, or are a configuration and control that are derived as a matter of course from the configurations and control of the first embodiment of the invention and the second embodiment of the invention in view of the configuration and control of the seventh embodiment of the invention that will be described hereinafter.

An internal combustion engine 10 shown in FIG. 13 includes an exhaust gas recirculation device (this device will be referred to hereinafter as "an EGR device") 50. However, the internal combustion engine 10 does not include a supercharger.

The EGR device 50 includes an exhaust gas recirculation pipe (this pipe will be referred to hereinafter as "an EGR pipe") 51, an exhaust gas recirculation control valve (this control valve will be referred to hereinafter as "an EGR control valve") 52, and an exhaust gas recirculation cooler (this cooler will be referred to hereinafter as "an EGR cooler") 53. The EGR device 50 can introduce exhaust gas discharged from the combustion chambers to the exhaust passage 40, into the intake passage 30 via an EGR pipe 51. The EGR pipe 51 is connected at one end thereof to the exhaust passage 40 (more specifically, the exhaust manifold 41), and at the other end thereof to the intake passage 30 (more specifically, the intake manifold 31). That is, the EGR pipe 51 couples the exhaust passage 40 to the intake passage 30.

The EGR control valve 52 is arranged in the EGR pipe 51. If the opening degree of the EGR control valve 52 (this opening degree will be referred to hereinafter as "an EGR control valve opening degree") is changed, the amount of exhaust gas passing through the EGR control valve 52 changes, and hence the amount of exhaust gas introduced into the intake passage 30 changes. The EGR control valve is electrically connected to the interface 85 of the electronic control unit 80. The electronic control unit 80 supplies the EGR control valve with a control signal for operating the EGR control valve 52. An EGR cooler 53 is arranged in the EGR pipe 51. The EGR cooler 53 cools exhaust gas flowing through the EGR pipe 51.

Next, the control of the EGR control valve according to the seventh embodiment of the invention will be described. Incidentally, in the following description, the term "EGR rate" means "a ratio of an amount of exhaust gas introduced into the intake passage by the EGR device to an amount of gas sucked into the combustion chambers", and the term "target EGR rate" means "a target value of the EGR rate".

In the seventh embodiment of the invention, a controller (this controller will be referred to hereinafter as "a composite controller") is prepared. A deviation of an actual EGR rate at a certain moment from the target EGR rate (this deviation will be referred to hereinafter as "an EGR rate deviation") and an amount of change in the EGR rate per unit time (this amount of change will be referred to hereinafter as "an EGR rate change rate") are input to the composite controller as pieces of input information. The composite controller is designed to generate a control signal for driving the EGR control valve such that the EGR rate approaches the target EGR rate with desired tracking properties, on the basis of these pieces of input information. Furthermore, a controller (this controller will be referred to hereinafter as "a single controller") is prepared. The EGR rate change rate is not input to the single controller, and the EGR rate deviation is input to the single controller as input information. The single controller is designed to generate a control signal for driving the EGR control valve such that the EGR rate approaches the target EGR rate with desired tracking properties, on the basis of this input information. In addition, composite control for controlling the EGR rate to the target EGR rate by supplying the EGR control valve with the control signal generated through the use of the aforementioned composite controller, and single control for controlling the EGR rate to the target EGR rate by supplying the EGR control valve with the control signal generated through the use of the aforementioned single controller can be selectively performed.

Then, during engine operation, if the absolute value of the EGR rate change rate is equal to or smaller than a predetermined EGR rate change rate, the EGR rate is controlled to the target EGR rate through the aforementioned single control. On the other hand, during engine operation, if the absolute value of the EGR rate change rate is larger than the aforementioned predetermined EGR rate change rate, the EGR rate is controlled to the target EGR rate through the aforementioned composite control.

Besides, in the seventh embodiment of the invention, when the control of the EGR rate is changed over from the aforementioned single control to the aforementioned composite control, composite control is started using a disturbance on the control of the EGR rate resulting from a change in the EGR rate at the time when the EGR rate has reached a stable equilibrium state through the control of the EGR rate by composite control, as an initial value of the disturbance in the composite control.

Next, the setting of the target EGR rate according to the seventh embodiment of the invention will be described. In the seventh embodiment of the invention, optimal EGR rates are obtained in advance through an experiment or the like in accordance with engine operation states that are prescribed by engine rotational speeds and required engine torques respectively. Then, these obtained EGR rates are stored in the electronic control unit as a reference EGR rate Regrb in the form of a map of a function of the engine rotational speed NE and the required engine torque TQ as shown in FIG. 13. Then, during engine operation, the reference EGR rate Regrb corresponding to the engine rotational speed NE at each moment and the required engine torque TQ at each moment is acquired from the map of FIG. 13. Then, the reference EGR rate Regrb thus acquired is set as the target EGR rate. Incidentally, in the map of FIG. 13, the reference EGR rate Regrb increases as the engine rotational speed NE increases, and the reference EGR rate Regrb increases as the required engine torque TQ increases.

According to the seventh embodiment of the invention, the following effects are obtained. That is, when the change in the EGR rate is relatively large, the degree to which the change in the EGR rate acts as a disturbance on the control of the EGR rate is relatively large. Accordingly, when the change in the EGR rate is relatively large, the possibility of the occurrence of a so-called overshoot, namely, an excess of the rising EGR rate far above the target EGR rate (this will be referred to hereinafter as "an overshoot of the EGR rate") or a so-called undershoot, namely, an excess of the falling EGR rate far below the target EGR rate (this will be referred to hereinafter as "an undershoot of the EGR rate") is high. Accordingly, from the standpoint of suppressing this overshoot of the EGR rate or this undershoot of the EGR rate, it is preferable to cause the control of the EGR rate to reflect the change in the EGR rate when the change in the EGR rate is relatively large. On the other hand, when the change in the EGR rate is small, the degree to which the change in the EGR rate acts as a disturbance on the control of the EGR rate is relatively small. Accordingly, when the change in the EGR rate is relatively small, the possibility of the occurrence of an overshoot of the EGR rate or an undershoot of the EGR rate is low. Accordingly, when the change in the EGR rate is relatively small, there is little need to cause the control of the EGR rate to reflect the change in the EGR rate, from the standpoint of suppressing an overshoot of the EGR rate or an undershoot of the EGR rate.

It should be noted herein that in the seventh embodiment of the invention, when the absolute value of the EGR rate change rate is larger than a predetermined EGR rate change rate, the EGR rate is controlled to the target EGR rate through composite control. It should be noted herein that composite control according to the seventh embodiment of the invention is the control designed to control the EGR rate to the target EGR rate in consideration of the change in the EGR rate that acts as a disturbance on the control of the EGR rate. That is, in the seventh embodiment of the invention, when the absolute value of the EGR rate change rate is larger than the predetermined EGR rate change rate and hence the degree to which the change in the EGR rate acts as a disturbance on the control of the EGR rate is relatively large, the EGR rate is controlled to the target EGR rate in consideration of the change in the EGR rate.

Thus, even when the degree to which the change in the EGR rate acts as a disturbance on the control of the EGR rate is relatively large, an effect of making it possible to suppress an overshoot of the EGR rate or an undershoot of the EGR rate is obtained.

Incidentally, single control according to the seventh embodiment of the invention, namely, the control designed to control the EGR rate to the target EGR rate without considering the change in the EGR rate that acts as a disturbance on the control of the EGR rate is used to control the EGR rate when the absolute value of the EGR rate change rate is equal to or smaller than the predetermined EGR rate change rate. That is, single control according to the seventh embodiment of the invention is used to control the EGR rate when the degree to which the change in the EGR rate acts as a disturbance on the control of the EGR rate is relatively small. Accordingly, in this case, even if single control is used to control the EGR rate, an overshoot of the EGR rate or an undershoot of the EGR rate is suppressed.

Furthermore, since single control is the control of the EGR rate that does not consider the change in the EGR rate that acts as a disturbance on the control of the EGR rate, the load that is applied to the electronic control unit to perform this single control is relatively small. Accordingly, when single control is used to control the EGR rate, an effect of performing the control of the EGR rate with small load while suppressing an overshoot of the EGR rate or an undershoot of the EGR rate as described above is obtained.

Furthermore, according to the seventh embodiment of the invention, the following effects are also obtained. That is, when the control of the EGR rate is changed over from single control to composite control, the control of the EGR rate is changed over from the control that does not consider the change in the EGR rate that acts as a disturbance on the control of the EGR rate to the control that considers the change in the EGR rate that acts as a disturbance on the control of the EGR rate. That is, the mode of the control of the EGR rate relatively greatly changes. Then, at this time, the stability of composite control becomes low. On the other hand, when the EGR rate has reached the stable equilibrium state through the control of the EGR rate by composite control, the stability of composite control is high. It should be noted herein that in the seventh embodiment of the invention, when the control of the EGR rate is changed over from single control to composite control, composite control is started using a disturbance on the control of the EGR rate resulting from the change in the EGR rate at the time when the EGR rate has reached the stable equilibrium state through the control of the EGR rate by the composite control, as an initial value of the disturbance of the composite control. That is, in the seventh embodiment of the invention, the composite control is started using a disturbance at the time when the stability of composite control is high, as an initial value of the disturbance in the composite control. In consequence, according to the seventh embodiment of the invention, an effect of making it possible to hold the stability of composite control high at a time point when the composite control is started is obtained.

Figure 15:
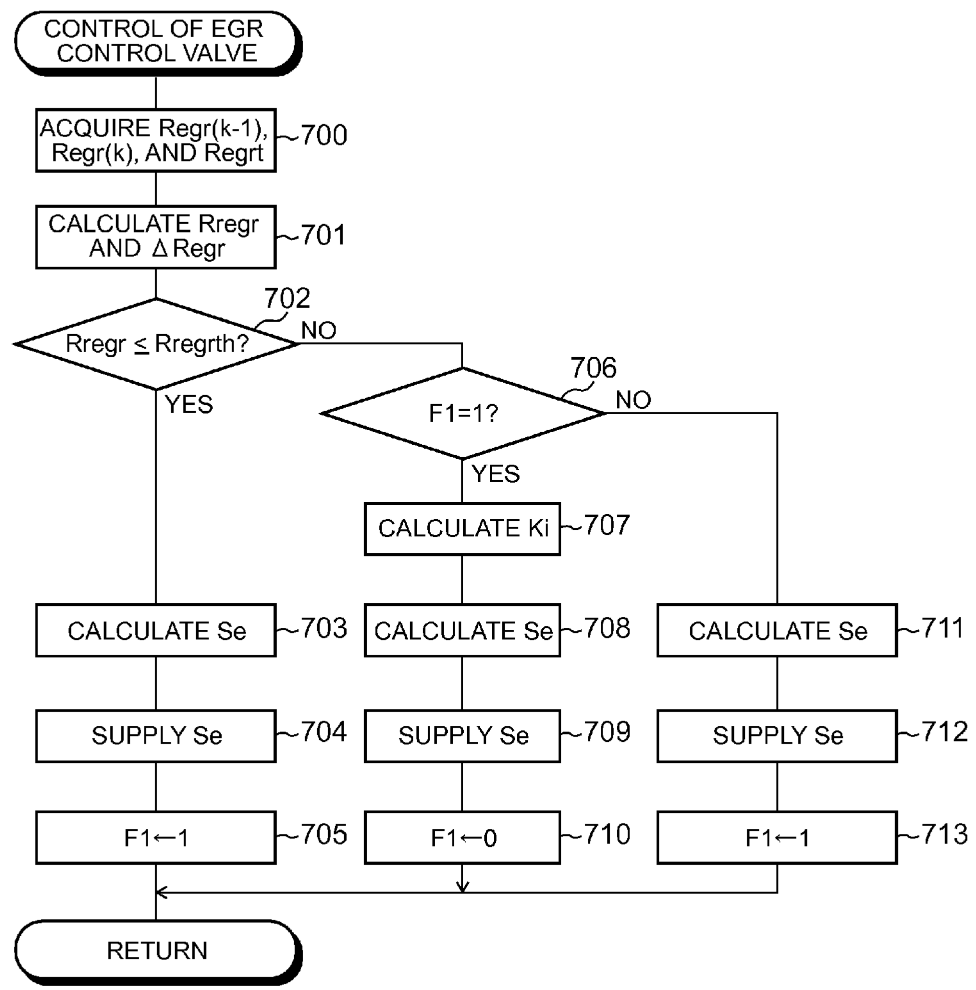
FIG. 15 is a view showing an example of a routine for performing the control of an EGR control valve according to a seventh embodiment of the invention.

Next, an example of a routine for performing the control of the EGR control valve according to the seventh embodiment of the invention will be described. The example of this routine is shown in FIG. 15. Incidentally, this routine is a routine that is started every time a predetermined crank angle is reached.

If the routine of FIG. 15 is started, first of all in step 700, an EGR rate Regr(k−1) during the last execution of the present routine, a current EGR rate Regr(k), and a latest target EGR rate Regrt set in the routine of FIG. 16 (the details of this routine will be described later) are acquired. Subsequently in step 71, a change rate of the EGR rate (i.e., an EGR rate change rate) Rregr from the last execution of the present routine to the current execution of the present routine is calculated on the basis of the EGR rate Regr(k−1) during the last execution of the present routine and the current EGR rate Regr(k), which are acquired in step 700, and a deviation of the current EGR rate from the target EGR rate (i.e., an EGR rate deviation) ΔRegr is calculated on the basis of the current EGR rate Regr(k) and the target EGR rate Regrt, which are acquired in step 700.

Subsequently in step 702, it is determined whether or not the EGR rate change rate Rregr calculated in step 701 is equal to or smaller than the predetermined EGR rate change rate Rregrth (Rregr≤Rregrth). If it is determined herein that Rregr≤Rregrth, the routine proceeds to step 703. On the other hand, if it is determined that Rregr>Rregrth, the routine proceeds to step 706.

In step 703, a control signal Se that should be supplied to the EGR control valve is calculated through single control using the EGR rate deviation ΔRegr calculated in step 701 as input information. Subsequently in step 704, the control signal Se calculated in step 703 is supplied to the EGR control valve. Subsequently in step 705, the composite control start flag F1 is set (F1←1), and then the routine ends. Incidentally, the composite control start flag F1 is a flag that is set as soon as the control of the EGR rate is changed over from single control to composite control, and is reset after composite control is started.

In step 706, it is determined whether or not the composite control start flag F1 is set (F1=1). If it is determined herein that F1=1, the routine proceeds to step 707. On the other hand, if it is determined that F1≠1, the routine proceeds to step 711.

In step 707, the disturbance Ki for the control of the EGR rate resulting from the change in the EGR rate at the time when the EGR rate has reached the stable equilibrium state through the control of the EGR rate by composite control is calculated. Subsequently in step 708, the control signal Se that should be supplied to the EGR control valve is calculated through composite control using the EGR rate deviation ΔRegr and the EGR rate change rate Rregr, which are calculated in step 701, and the disturbance Ki calculated in step 707, as input information. Subsequently in step 709, the control signal Se calculated in step 708 is supplied to the EGR control valve. Subsequently in step 710, the composite control start flag F1 is reset, and then the routine ends.

In step 711, the control signal Se that should be supplied to the EGR control valve is calculated through composite control, using the EGR rate deviation ΔRegr and the EGR rate change rate Regr, which are calculated in step 701, as input information. Subsequently in step 712, the control signal Se calculated in step 711 is supplied to the EGR control valve. Subsequently in step 713, the composite control start flag F1 is set, and then the routine ends.

Figure 14:
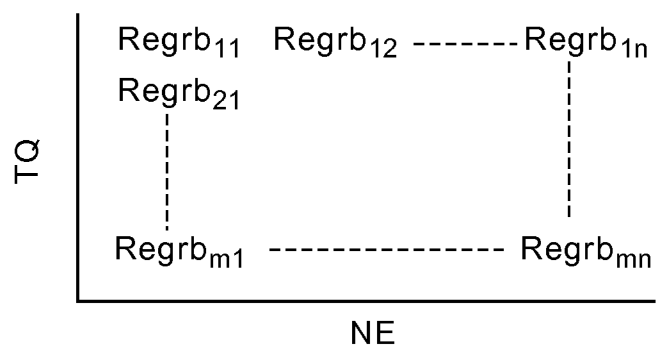
FIG. 14 is a view showing a map that is used to acquire a reference EGR rate.

Next, an example of a routine for setting the target EGR rate according to the seventh embodiment of the invention will be described. The example of this routine is shown in FIG. 16. Incidentally, this routine is a routine that is started every time a predetermined crank angle is reached. If the routine of FIG. 16 is started, first of all in step 40, the current engine rotational speed NE and the required engine torque TQ are acquired. Subsequently in step 41, the reference EGR rate Regrb corresponding to the engine rotational speed NE and the required engine torque TQ, which are acquired in step 40, is acquired from a map of FIG. 14. Subsequently in step 42, the reference EGR rate Regrb acquired in step 41 is set to the target EGR rate Regrt, and then the routine ends.

The idea about the changeover of the control of the boost pressure described in association with the third embodiment of the invention and the idea about the setting of the initial value of the disturbance described in association with the fourth embodiment of the invention can also be applied to the control of the EGR rate in the internal combustion engine shown in FIG. 13. An embodiment of the invention in this case (which will be referred to hereinafter as "the eighth embodiment of the invention") will be described hereinafter. Incidentally, the configuration and control according to the eighth embodiment of the invention that will not be described hereinafter are identical to the configurations and control of the third embodiment of the invention and the fourth embodiment of the invention, or are a configuration and control that are derived as a matter of course from the configurations and control of the third embodiment of the invention and the fourth embodiment of the invention in view of the configuration and control of the eighth embodiment of the invention that will be described hereinafter.

In the eighth embodiment of the invention, a controller (this controller will be referred to hereinafter as "a composite controller") is prepared. An EGR rate deviation and a fuel injection amount change rate are input to the composite controller as pieces of input information. The composite controller generates a control signal for driving the EGR control valve such that the EGR rate approaches a target EGR rate with desired tracking properties, on the basis of these pieces of input information. Furthermore, a controller (this controller will be referred to hereinafter as "a single controller) is prepared. The fuel injection amount change rate is not input to the single controller as input information, and the EGR rate deviation is input to the single controller as input information. The single controller generates a control signal for driving the EGR control valve such that the EGR rate approaches the target EGR rate with desired tracking properties, on the basis of this input information. In addition, composite control for controlling the EGR rate to the target EGR rate by supplying the EGR control valve with the control signal generated through the use of the aforementioned composite controller, and single control for controlling the EGR rate to the target EGR rate by supplying the EGR control valve with the control signal generated through the use of the aforementioned single controller can be selectively performed.

Then, during engine operation, if the absolute value of the fuel injection amount change rate is equal to or smaller than a predetermined fuel injection amount change rate, the EGR rate is controlled to the target EGR rate through the aforementioned single control. On the other hand, during engine operation, if the absolute value of the fuel injection amount change rate is larger than the aforementioned predetermined fuel injection amount change rate, the EGR rate is controlled to the target EGR rate through the aforementioned composite control.

Besides, in the eighth embodiment of the invention, when the control of the EGR rate is changed over from the aforementioned single control to the aforementioned composite control, composite control is started using a disturbance on the control of the EGR rate resulting from the change in the fuel injection amount at the time when the EGR rate has reached the stable equilibrium state through the control of the EGR rate by the composite control, as an initial value of the disturbance in the composite control.

According to the eighth embodiment of the invention, the following effects are obtained. That is, since the amount of combustion in the combustion chambers increases as the fuel injection amount increases, the pressure of exhaust gas discharged from the combustion chambers tends to rise as the fuel injection amount increases. In addition, even if the opening degree of the EGR control valve remains the same, the amount of exhaust gas introduced into the intake passage by the EGR device increases as the pressure of exhaust gas discharged from the combustion chambers rises. As a matter of course, since the amount of combustion in the combustion chambers decreases as the fuel injection amount decreases, the pressure of exhaust gas discharged from the combustion chambers tends to fall as the fuel injection amount increases. In addition, even if the opening degree of the EGR control valve remains the same, the amount of exhaust gas introduced into the intake passage by the EGR device decreases as the pressure of exhaust gas discharged from the combustion chambers falls.

That is, the amount of exhaust gas introduced into the intake passage by the EGR device changes in accordance with the fuel injection amount. Accordingly, when the change in the fuel injection amount is relatively large, the degree to which the change in the fuel injection amount acts as a disturbance on the control of the EGR rate is relatively large. Accordingly, when the change in the fuel injection amount is relatively large, the possibility of the occurrence of an overshoot of the EGR rate or an undershoot of the EGR rate is high. Accordingly, from the standpoint of suppressing this overshoot of the EGR rate or this undershoot of the EGR rate, it is preferable to cause the control of the EGR rate to reflect the change in the fuel injection amount when the change in the fuel injection amount is relatively large. On the other hand, when the change in the fuel injection amount is relatively small, the degree to which the change in the fuel injection amount acts as a disturbance on the control of the EGR rate is relatively small. Accordingly, when the change in the fuel injection amount is relatively small, the possibility of the occurrence of an overshoot of the EGR rate or an undershoot of the EGR rate is low. Accordingly, when the change in the fuel injection amount is relatively small, there is little need to cause the control of the EGR rate to reflect the change in the fuel injection amount, from the standpoint of suppressing an overshoot of the EGR rate or an undershoot of the EGR rate.

It should be noted herein that in the eighth embodiment of the invention, when the absolute value of the fuel injection amount change rate is larger than a predetermined fuel injection amount change rate, the EGR rate is controlled to a target EGR rate through composite control. It should be noted herein that composite control according to the eighth embodiment of the invention is the control designed to control the EGR rate to the target EGR rate in consideration of the change in the fuel injection amount that acts as a disturbance on the control of the EGR rate. That is, in the eighth embodiment of the invention, when the absolute value of the fuel injection amount change rate is larger than the predetermined fuel injection amount change rate and hence the degree to which the change in the fuel injection amount acts as a disturbance on the control of the EGR rate is relatively large, the EGR rate is controlled to the target EGR rate in consideration of the change in the fuel injection amount.

Thus, even when the degree to which the change in the fuel injection amount acts as a disturbance on the control of the EGR rate is relatively large, an effect of making it possible to suppress an overshoot of the EGR rate or an undershoot of the EGR rate is obtained.

Incidentally, single control according to the eighth embodiment of the invention, namely, the control designed to control the EGR rate to the target EGR rate without considering the change in the fuel injection amount that acts as a disturbance on the control of the EGR rate is used to control the EGR rate when the absolute value of the fuel injection amount change rate is equal to or smaller than the predetermined fuel injection amount change rate. That is, single control according to the eighth embodiment of the invention is used to control the EGR rate when the degree to which the change in the fuel injection amount acts as a disturbance on the control of the EGR rate is relatively small. Accordingly, in this case, even if single control is used to control the EGR rate, an overshoot of the EGR rate or an undershoot of the EGR rate is suppressed.

Furthermore, since single control is the control of the EGR rate that does not consider the change in the fuel injection amount that acts as a disturbance on the control of the EGR rate, the load that is applied to the electronic control unit to perform this single control is relatively small. Accordingly, when single control is used to control the EGR rate, an effect of performing the control of the EGR rate with small load while suppressing an overshoot of the EGR rate or an undershoot of the EGR rate as described above is obtained.

Furthermore, according to the eighth embodiment of the invention, the following effects are also obtained. That is, when the control of the EGR rate is changed over from single control to composite control, the control of the EGR rate is changed over from the control that does not consider the change in the fuel injection amount that acts as a disturbance on the control of the EGR rate to the control that considers the change in the fuel injection amount that acts as a disturbance on the control of the EGR rate. That is, the mode of the control of the EGR rate relatively greatly changes. Then, at this time, the stability of composite control becomes low. On the other hand, when the EGR rate has reached the stable equilibrium state through the control of the EGR rate by composite control, the stability of composite control is high. It should be noted herein that in the eighth embodiment of the invention, when the control of the EGR rate is changed over from single control to composite control, composite control is started using a disturbance on the control of the EGR rate resulting from the change in the fuel injection amount at the time when the EGR rate has reached the stable equilibrium state through the control of the EGR rate by the composite control, as an initial value of the disturbance of the composite control. That is, in the eighth embodiment of the invention, the composite control is started using a disturbance at the time when the stability of composite control is high, as an initial value of the disturbance in the composite control. In consequence, according to the eighth embodiment of the invention, an effect of making it possible to hold the stability of composite control high at a time point when the composite control is started is obtained.

Figure 17:
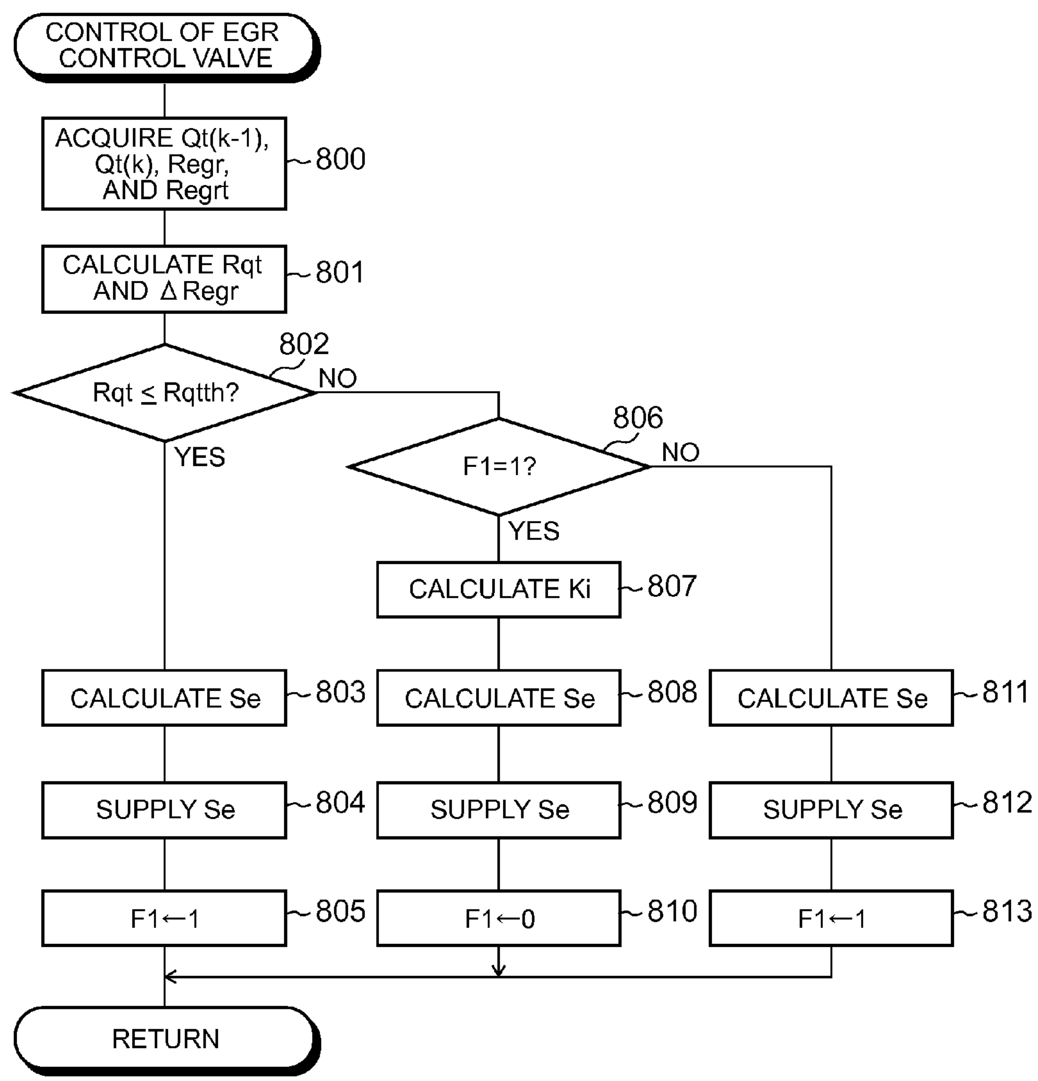
FIG. 17 is a view showing an example of a routine for performing the control of an EGR control valve according to an eighth embodiment of the invention.

Next, an example of a routine for performing the control of the EGR control valve according to the eighth embodiment of the invention will be described. The example of this routine is shown in FIG. 17. Incidentally, this routine is a routine that is started every time a predetermined crank angle is reached.

Figure 16:
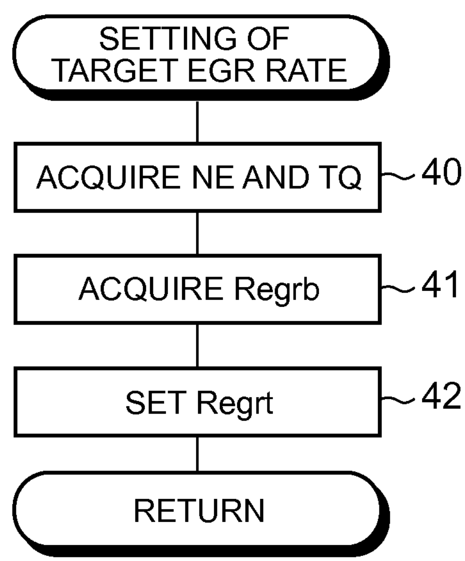
FIG. 16 is a view showing an example of a routine for setting a target EGR rate according to the seventh embodiment of the invention.

If the routine of FIG. 17 is started, first of all in step 800, the target fuel injection amount Qt(k−1) during the last execution of the present routine, the current target fuel injection amount Qt(k), the current EGR rate Regr, and the latest target EGR rate Regrt set in the routine of FIG. 16 are acquired. Subsequently in step 801, the change rate of the fuel injection amount (i.e., the fuel injection amount change rate) Rqt from the last execution of the present routine to the current execution of the present routine is calculated on the basis of the target fuel injection amount Qt(k−1) during the last execution of the present routine and the current target fuel injection amount Qt(k), which are acquired in step 800, and the deviation of the current EGR rate from the target EGR rate (i.e., the EGR rate deviation) ΔRegr is calculated on the basis of the current EGR rate Regr and the target EGR rate Regrt, which are acquired in step 800.

Subsequently in step 802, it is determined whether or not the fuel injection amount change rate Rqt calculated in step 801 is equal to or smaller than the predetermined fuel injection amount change rate Rqtth (Rqt≤Rqtth). If it is determined herein that Rqt≤Rqtth, the routine proceeds to step 803. On the other hand, if it is determined that Rqt>Rqtth, the routine proceeds to step 806.

In step 803, the control signal Se that should be supplied to the EGR control valve is calculated through single control using the EGR rate deviation ΔRegr calculated in step 801 as input information. Subsequently in step 804, the control signal Se calculated in step 803 is supplied to the EGR control valve. Subsequently in step 805, the composite control start flag F1 is set (F1←1), and then the routine ends. Incidentally, the composite control start flag F1 is a flag that is set as soon as the control of the EGR rate is changed over from single control to composite control, and is reset after composite control is started.

In step 806, it is determined whether or not the composite control start flag F1 is set (F1=1). If it is determined herein that F1=1, the routine proceeds to step 807. On the other hand, if it is determined that F1≠1, the routine proceeds to step 811.

In step 807, the disturbance Ki for the control of the EGR rate resulting from the change in the EGR rate at the time when the EGR rate has reached the stable equilibrium state through the control of the EGR rate by composite control is calculated. Subsequently in step 808, the control signal Se that should be supplied to the EGR control valve is calculated through composite control using the EGR rate deviation ΔRegr and the fuel injection amount change rate Rqt, which are calculated in step 801, and the disturbance Ki calculated in step 807, as input information. Subsequently in step 809, the control signal Se calculated in step 808 is supplied to the EGR control valve. Subsequently in step 810, the composite control start flag F1 is reset, and then the routine ends.

In step 811, the control signal Se that should be supplied to the EGR control valve is calculated through composite control, using the EGR rate deviation ΔRegr and the fuel injection amount change rate Rqt, which are calculated in step 801, as input information. Subsequently in step 812, the control signal Se calculated in step 811 is supplied to the EGR control valve. Subsequently in step 813, the composite control start flag F1 is set, and then the routine ends.

The idea about the changeover of the control of the boost pressure described in association with the fifth embodiment of the invention and the idea about the setting of the initial value of the disturbance described in association with the sixth embodiment of the invention can also be applied to the control of the EGR rate in the internal combustion engine shown in FIG. 13. An embodiment of the invention in this case (which will be referred to hereinafter as "the ninth embodiment of the invention") will be described hereinafter. Incidentally, the configuration and control according to the ninth embodiment of the invention that will not be described hereinafter are identical to the configurations and control of the fifth embodiment of the invention and the sixth embodiment of the invention, or are a configuration and control that are derived as a matter of course from the configurations and control of the fifth embodiment of the invention and the sixth embodiment of the invention in view of the configuration and control of the ninth embodiment of the invention that will be described hereinafter.

In the ninth embodiment of the invention, a controller (this controller will be referred to hereinafter as "a composite controller") is prepared. An EGR rate deviation, a fuel injection amount change rate, and an EGR rate change rate are input to the composite controller as pieces of input information. The composite controller is designed to generate a control signal for driving the EGR control valve such that the EGR rate approaches a target EGR rate with desired tracking properties, on the basis of these pieces of input information. Furthermore, a controller (this controller will be referred to hereinafter as "a single controller) is prepared. The fuel injection amount change rate and the EGR rate change rate are not input to the single controller as input information, and the EGR rate deviation is input to the single controller as input information. The single controller is designed to generate a control signal for driving the EGR control valve such that the EGR rate approaches the target EGR rate with desired tracking properties, on the basis of this input information. In addition, composite control for controlling the EGR rate to the target EGR rate by supplying the EGR control valve with the control signal generated through the use of the aforementioned composite controller, and single control for controlling the EGR rate to the target EGR rate by supplying the EGR control valve with the control signal generated through the use of the aforementioned single controller can be selectively performed.

Then, during engine operation, if the absolute value of the fuel injection amount change rate is equal to or smaller than a predetermined fuel injection amount change rate and the absolute value of the EGR rate change rate is equal to or smaller than a predetermined EGR rate change rate, the EGR rate is controlled to the target EGR rate through the aforementioned single control. On the other hand, during engine operation, at least when the absolute value of the fuel injection amount change rate is larger than the aforementioned predetermined fuel injection amount change rate or when the absolute value of the EGR rate change rate is larger than the aforementioned predetermined EGR rate change rate, the EGR rate is controlled to the target EGR rate through the aforementioned composite control.

Besides, in the ninth embodiment of the invention, when the control of the EGR rate is changed over from the aforementioned single control to the aforementioned composite control, the composite control is started using a disturbance on the control of the EGR rate resulting from the change in the fuel injection amount and the change in the EGR rate at the time when the EGR rate has reached the stable equilibrium state through the control of the EGR rate by the composite control, as an initial value of the disturbance in the composite control.

According to the ninth embodiment of the invention, the following effects are obtained. That is, as described above, the amount of exhaust gas introduced into the intake passage by the EGR device changes in accordance with the fuel injection amount. Accordingly, from the standpoint of suppressing an overshoot of the EGR rate or an undershoot of the EGR rate, it is preferable to cause the control of the EGR rate to reflect the change in the fuel injection amount when the change in the fuel injection amount is relatively large. On the other hand, when the change in the fuel injection amount is relatively small, there is little need to cause the control of the EGR rate to reflect the change in the fuel injection amount, from the standpoint of suppressing an overshoot of the EGR rate or an undershoot of the EGR rate.

Besides, as described above, when the change in the EGR rate is relatively large, the degree to which the change in the EGR rate acts as a disturbance on the control of the EGR rate is relatively large. Accordingly, from the standpoint of suppressing an overshoot of the EGR rate or an undershoot of the EGR rate, it is preferable to cause the control of the EGR rate to reflect the change in the EGR rate when the change in the EGR rate is relatively large. On the other hand, when the change in the EGR rate is relatively small, there is little need to cause the control of the EGR rate to reflect the change in the EGR rate, from the standpoint of suppressing an overshoot of the EGR rate or an undershoot of the EGR rate.

It should be noted herein that in the ninth embodiment of the invention, at least when the absolute value of the fuel injection amount change rate is larger than a predetermined fuel injection amount change rate or when the absolute value of the EGR rate change rate is larger than a predetermined EGR rate change rate, the EGR rate is controlled to a target EGR rate through composite control. It should be noted herein that composite control according to the ninth embodiment of the invention is the control designed to control the EGR rate to the target EGR rate in consideration of the change in the fuel injection amount and the change in the EGR rate that act as a disturbance on the control of the EGR rate. That is, in the ninth embodiment of the invention, when the absolute value of the fuel injection amount change rate is larger than the predetermined fuel injection amount change rate and hence the degree to which the change in the fuel injection amount acts as a disturbance on the control of the EGR rate is relatively large, the EGR rate is controlled to the target EGR rate in consideration of the change in the fuel injection amount. When the absolute value of the EGR rate change rate is larger than the predetermined EGR rate change rate and hence the degree to which the change in the EGR rate acts as a disturbance on the control of the EGR rate is relatively large, the EGR rate is controlled to the target EGR rate in consideration of the change in the EGR rate.

Thus, even when the degree to which the change in the fuel injection amount acts as a disturbance on the control of the EGR rate is relatively large, or even when the degree to which the change in the EGR rate acts as a disturbance on the control of the EGR rate is relatively large, an effect of making it possible to suppress an overshoot of the EGR rate or an undershoot of the EGR rate is obtained.

Incidentally, single control according to the ninth embodiment of the invention, namely, the control designed to control the EGR rate to the target EGR rate without considering the change in the fuel injection amount and the change in the EGR rate that act as a disturbance on the control of the EGR rate is used to control the EGR rate when the absolute value of the fuel injection amount change rate is equal to or smaller than the predetermined fuel injection amount change rate and the absolute value of the EGR rate change rate is equal to or smaller than the predetermined EGR rate change rate. That is, single control according to the ninth embodiment of the invention is used to control the EGR rate when the degree to which the change in the fuel injection amount and the change in the EGR rate act as a disturbance on the control of the EGR rate is relatively small. Accordingly, in this case, even if single control is used to control the EGR rate, an overshoot of the EGR rate or an undershoot of the EGR rate is suppressed.

Furthermore, since single control is the control of the EGR rate that does not consider the change in the fuel injection amount and the change in the EGR rate that act as a disturbance on the control of the EGR rate, the load that is applied to the electronic control unit to perform this single control is relatively small. Accordingly, when single control is used to control the EGR rate, an effect of performing the control of the EGR rate with small load while suppressing an overshoot of the EGR rate or an undershoot of the EGR rate as described above is obtained.

Furthermore, according to the ninth embodiment of the invention, the following effects are also obtained. That is, when the control of the EGR rate is changed over from single control to composite control, the control of the EGR rate is changed over from the control that does not consider the change in the fuel injection amount and the change in the EGR rate that act as a disturbance on the control of the EGR rate to the control that considers the change in the fuel injection amount and the change in the EGR rate that act as a disturbance on the control of the EGR rate. That is, the mode of the control of the EGR rate relatively greatly changes. Then, at this time, the stability of composite control becomes low. On the other hand, when the EGR rate has reached the stable equilibrium state through the control of the EGR rate by composite control, the stability of composite control is high. It should be noted herein that in the ninth embodiment of the invention, when the control of the EGR rate is changed over from single control to composite control, composite control is started using a disturbance on the control of the EGR rate resulting from the change in the fuel injection amount and the change in the EGR rate at the time when the EGR rate has reached the stable equilibrium state through the control of the EGR rate by the composite control, as an initial value of the disturbance of the composite control. That is, in the ninth embodiment of the invention, the composite control is started using a disturbance at the time when the stability of composite control is high, as an initial value of the disturbance in the composite control. In consequence, according to the ninth embodiment of the invention, an effect of making it possible to hold the stability of composite control high at a time point when the composite control is started is obtained.

Figure 18:
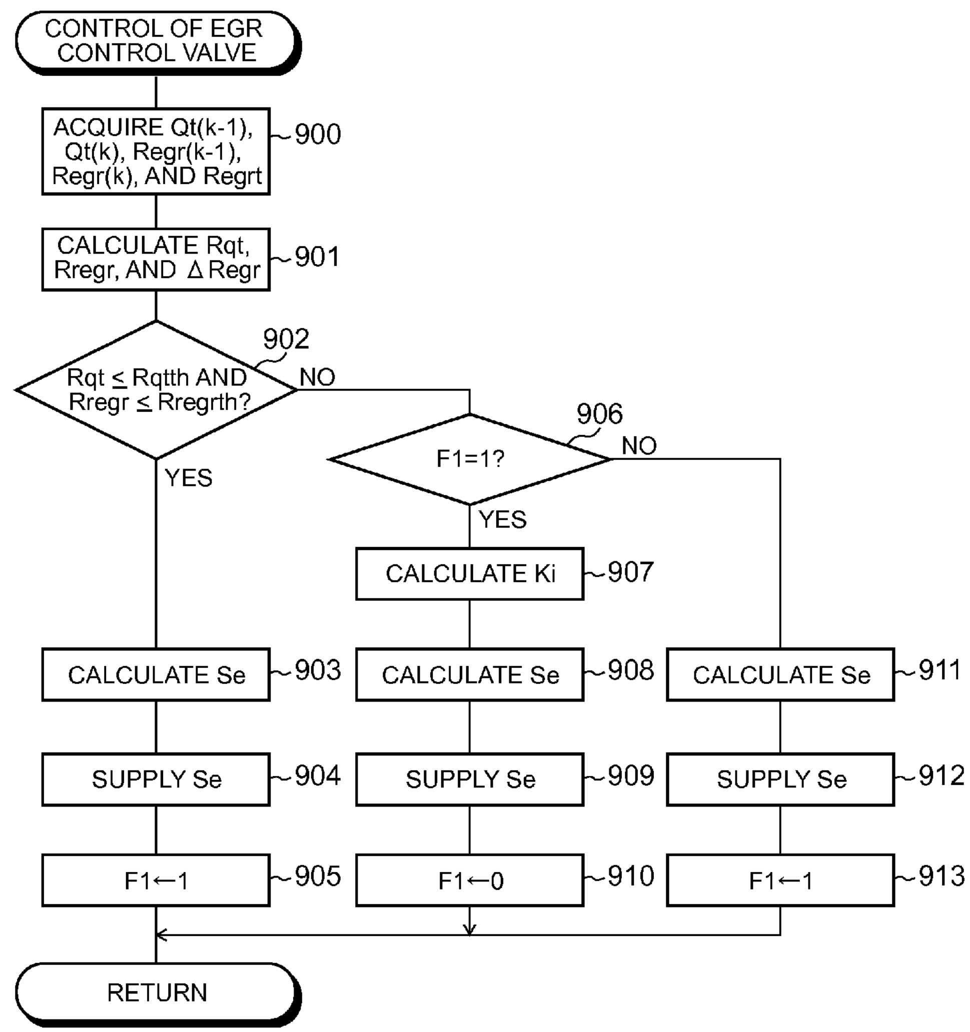
FIG. 18 is a view showing an example of a routine for performing the control of an EGR control valve according to a ninth embodiment of the invention.

Next, an example of a routine for performing the control of the EGR control valve according to the ninth embodiment of the invention will be described. The example of this routine is shown in FIG. 18. Incidentally, this routine is a routine that is started every time a predetermined crank angle is reached.

If the routine of FIG. 18 is started, first of all in step 900, the target fuel injection amount Qt(k−1) during the last execution of the present routine, the current target fuel injection amount Qt(k), the EGR rate Regr(k−1) during the last execution of the present routine, the current EGR rate Regr(k), and the latest target EGR rate Regrt set in the routine of FIG. 16 are acquired. Subsequently in step 901, the change rate of the fuel injection amount (i.e., the fuel injection amount change rate) Rqt from the last execution of the present routine to the current execution of the present routine is calculated on the basis of the target fuel injection amount Qt(k−1) during the last execution of the present routine and the current target fuel injection amount Qt(k), which are acquired in step 900, and the change rate of the EGR rate (i.e., the EGR rate change rate) Rregr from the last execution of the present routine to the current execution of the present routine is calculated on the basis of the EGR rate Regr(k−1) during the last execution of the present routine and the current EGR rate Regr(k), which are acquired in step 900. Also, the deviation of the current EGR rate from the target EGR rate (i.e., the EGR rate deviation) ΔRegr is calculated on the basis of the current EGR rate Regr(k) and the target EGR rate Regrt, which are acquired in step 900.

Subsequently in step 902, it is determined whether or not the fuel injection amount change rate Rqt calculated in step 901 is equal to or smaller than the predetermined fuel injection amount change rate Rqtth (Rqt≤Rqtth) and the EGR rate change rate Rregr calculated in step 901 is equal to or smaller than the predetermined EGR rate change rate Rregrth (Rregr≤Rregrth). If it is determined herein that Rqt≤Rqtth and Rregr≤Rregrth, the routine proceeds to step 903. On the other hand, if it is determined that Rqt>Rqtth or Rregr>Rregrth, the routine proceeds to step 906.

In step 903, the control signal Se that should be supplied to the EGR control valve is calculated through single control using the EGR rate deviation ΔRegr calculated in step 901 as input information. Subsequently in step 904, the control signal Se calculated in step 903 is supplied to the EGR control valve. Subsequently in step 905, the composite control start flag F1 is set (F1←1), and then the routine ends. Incidentally, the composite control start flag F1 is a flag that is set as soon as the control of the EGR rate is changed over from single control to composite control, and is reset after composite control is started.

In step 906, it is determined whether or not the composite control start flag F1 is set (F1=1). If it is determined herein that F1=1, the routine proceeds to step 907. On the other hand, if it is determined that F1≠1, the routine proceeds to step 911.

In step 907, the disturbance Ki for the control of the EGR rate resulting from the change in the EGR rate at the time when the EGR rate has reached the stable equilibrium state through the control of the EGR rate by composite control is calculated. Subsequently in step 908, the control signal Se that should be supplied to the EGR control valve is calculated through composite control using the EGR rate deviation ΔRegr, the fuel injection amount change rate Rqt, and the EGR rate change rate Rregr, which are calculated in step 901, and the disturbance Ki calculated in step 907, as input information. Subsequently in step 909, the control signal Se calculated in step 908 is supplied to the EGR control valve. Subsequently in step 910, the composite control start flag F1 is reset, and then the routine ends.

In step 911, the control signal Se that should be supplied to the EGR control valve is calculated through composite control, using the EGR rate deviation ΔRegr, the fuel injection amount change rate Rqt, and the EGR rate change rate Rregr, which are calculated in step 901, as input information. Subsequently in step 912, the control signal Se calculated in step 911 is supplied to the EGR control valve. Subsequently in step 913, the composite control start flag F1 is set, and then the routine ends.

Figure 19:
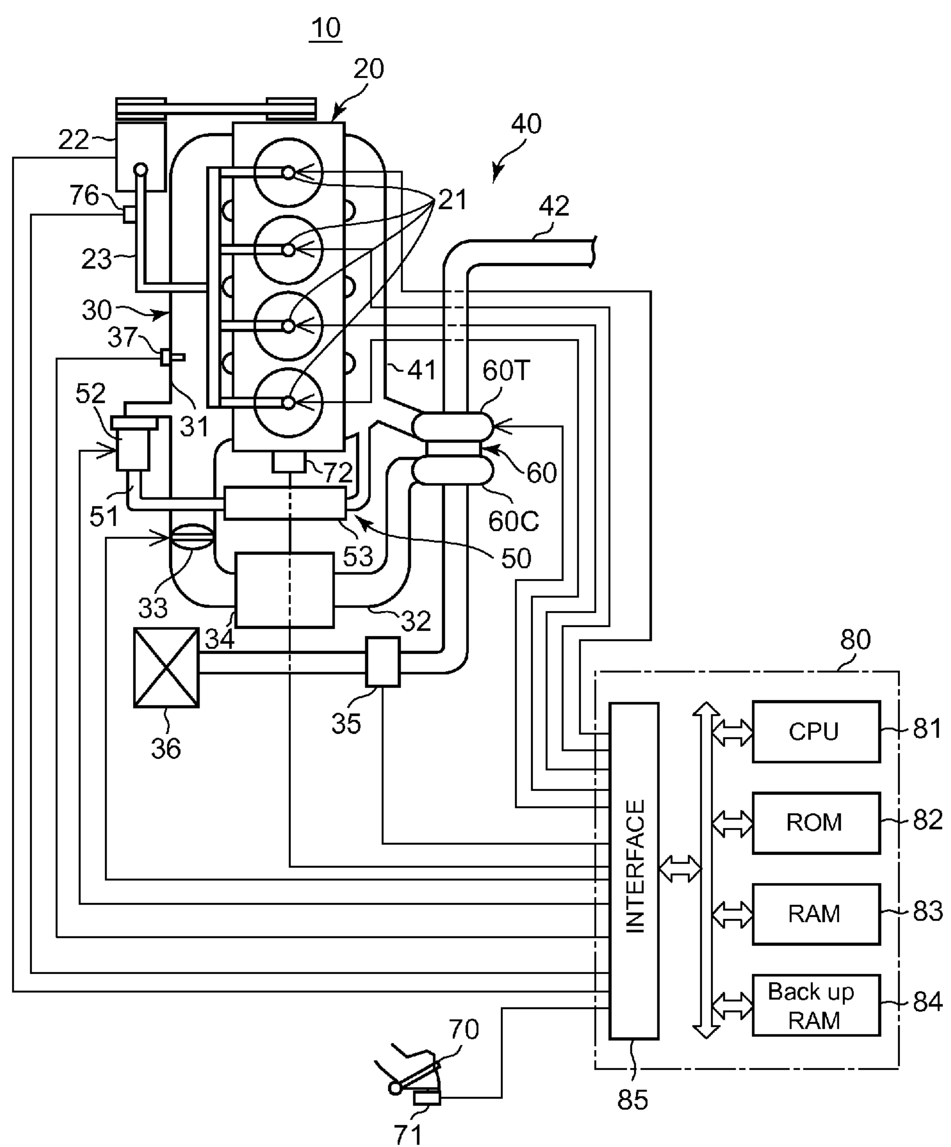
FIG. 19 is a view showing an internal combustion engine to which the control apparatus according to the invention is applied.

The ideas about the changeover of the control of the boost pressure described in association with the first embodiment of the invention, the third embodiment of the invention, and the fifth embodiment of the invention, and the ideas about the setting of the initial value of the disturbance described in association with the second embodiment of the invention, the fourth embodiment of the invention, and the sixth embodiment of the invention can also be applied to the control of the boost pressure in an internal combustion engine shown in FIG. 19. The ideas about the control of the EGR rate and the setting of the initial value of the disturbance described in association with the seventh to ninth embodiments of the invention can also be applied to the control of the EGR rate in the internal combustion engine shown in FIG. 19.

Incidentally, the internal combustion engine 10 shown in FIG. 19 includes the supercharger 60 and the EGR device 50. The supercharger 60 is the same as the supercharger 60 shown in FIG. 1, and the EGR device 50 is the same as the EGR device 50 shown in FIG. 13.

Besides, the degree of the influence of the change in the boost pressure on the control of the boost pressure, the degree of the influence of the change in the fuel injection amount on the control of the boost pressure, and the degree of the influence of the change in the fuel injection amount on the control of the boost pressure are larger when the control of the EGR rate is not performed than when the control of the EGR rate is performed. Thus, in the case where the ideas about the changeover of the control of the boost pressure described in association with the first embodiment of the invention, the third embodiment of the invention, and the fifth embodiment of the invention are applied to the control of the boost pressure regarding the control of the boost pressure in the internal combustion engine shown in FIG. 19, a condition that the control of the EGR rate not be performed may be added as the condition for changing over the control of the boost pressure from single control to composite control. In this case, in the case where the idea about the changeover of the control of the boost pressure described in association with the first embodiment of the invention is applied to the control of the boost pressure regarding the control of the boost pressure in the internal combustion engine shown in FIG. 19, when the absolute value of the boost pressure change rate is larger than the predetermined boost pressure change rate and the control of the EGR rate is not performed, the boost pressure is controlled to the target boost pressure through composite control. In the case where the idea about the changeover of the control of the boost pressure described in association with the third embodiment of the invention is applied to the control of the boost pressure regarding the control of the boost pressure in the internal combustion engine shown in FIG. 19, when the absolute value of the fuel injection amount change rate is larger than the predetermined fuel injection amount change rate and the control of the EGR rate is not performed, the boost pressure is controlled to the target boost pressure through composite control. In the case where the idea about the changeover of the control of the boost pressure described in association with the fifth embodiment of the invention is applied to the control of the boost pressure regarding the control of the boost pressure in the internal combustion engine shown in FIG. 19, when the absolute value of the fuel injection amount change rate is larger than the predetermined fuel injection amount change rate and the control of the EGR rate is not performed, or when the absolute value of the boost pressure change rate is larger than the predetermined boost pressure change rate and the control of the EGR rate is not performed, the boost pressure is controlled to the target boost pressure through composite control.

Figure 20:
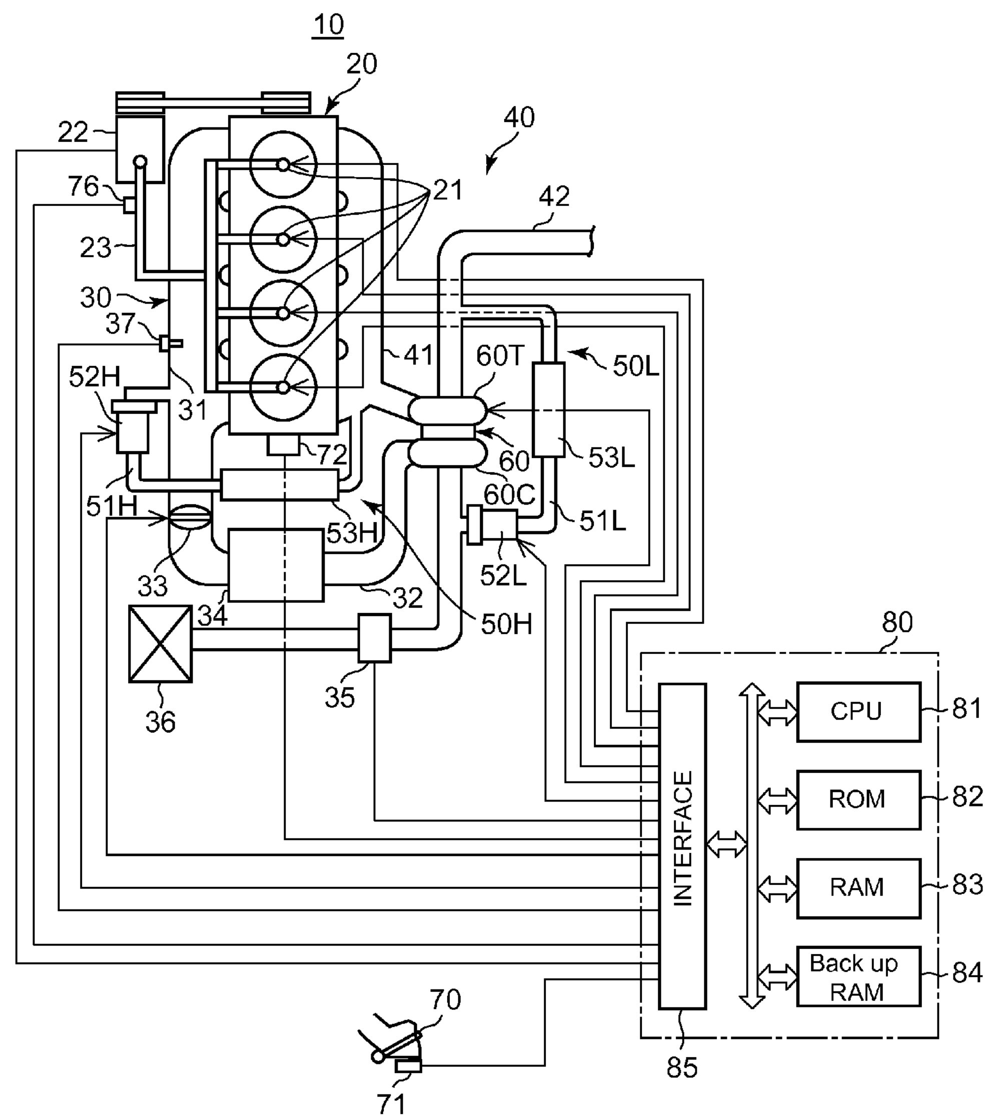
FIG. 20 is a view showing an internal combustion engine to which the control apparatus according to the invention is applied.

Besides, the ideas about the changeover of the control of the boost pressure described in association with the first embodiment of the invention, the third embodiment of the invention, and the fifth embodiment of the invention, and the ideas about the setting of the initial value of the disturbance described in association with the second embodiment of the invention, the fourth embodiment of the invention, and the sixth embodiment of the invention can also be applied to the control of the boost pressure in an internal combustion engine shown in FIG. 20. The ideas about the control of the EGR rate and the ideas about the setting of the initial value of the disturbance, which are described in association with the seventh to ninth embodiments of the invention, can also be applied to the control of the EGR rate in the internal combustion engine shown in FIG. 20.

Incidentally, the internal combustion engine 10 shown in FIG. 20 includes the supercharger 60, a low-pressure EGR device 50L, and a high-pressure EGR device 50H. The supercharger 60 is the same as the supercharger 60 shown in FIG. 1.

Besides, the high-pressure EGR device 50H is the same as the EGR device 50 shown in FIG. 13. That is, the high-pressure EGR device 50H includes a high-pressure EGR pipe 51H, a high-pressure EGR control valve 52H, and a high-pressure EGR cooler 53H. The high-pressure EGR device 5H can introduce exhaust gas discharged from the combustion chambers to the exhaust passage 40, into the intake passage 30 via the high-pressure EGR pipe 51H. The high-pressure EGR pipe 51H is connected at one end thereof to the exhaust passage 40 (more specifically, the exhaust manifold 41) upstream of an exhaust turbine 60T, and at the other end thereof to the intake passage 30 (more specifically, the intake manifold 31) downstream of the compressor 6C. That is, the high-pressure EGR pipe 51H couples the exhaust passage 40 to the intake passage 30.

The high-pressure EGR control valve 52H is arranged in the high-pressure EGR pipe 51H. If the opening degree of the high-pressure EGR control valve 52H (this opening degree will be referred to hereinafter as "a high-pressure EGR control valve opening degree") is changed, the amount of exhaust gas passing through the high-pressure EGR control valve 52H changes, and hence the amount of exhaust gas introduced into the intake passage 30 by the high-pressure EGR device 50H changes. The high-pressure EGR control valve is electrically connected to the interface 85 of the electronic control unit 80. The electronic control unit 80 supplies the high-pressure EGR control valve with a control signal for operating the high-pressure EGR control valve 52H. The high-pressure EGR cooler 53H is arranged in the high-pressure EGR pipe 51H. The high-pressure EGR cooler 53H cools exhaust gas flowing through the high-pressure EGR pipe 51H.

Besides, the low-pressure EGR device 50L includes a low-pressure EGR pipe 51L, a low-pressure EGR control valve 52L, and a low-pressure EGR cooler 53L. The low-pressure EGR device 50L can introduce exhaust gas discharged from the combustion chambers to the exhaust passage 40, into the intake passage 30 via the low-pressure EGR pipe 51L. The low-pressure EGR pipe 51L is connected at one end thereof to the exhaust passage 40 (more specifically, the exhaust pipe 42) downstream of the exhaust turbine 60T, and at the other end thereof to the intake passage 30 (more specifically, the intake pipe 32) upstream of the compressor 60C. That is, the low-pressure EGR pipe 51L couples the exhaust passage 40 to the intake passage 30.

The low-pressure EGR control valve 52L is arranged in the low-pressure EGR pipe 51L. If the opening degree of the low-pressure EGR control valve 52L (this opening degree will be referred to hereinafter as "a low-pressure EGR control valve opening degree") is changed, the amount of exhaust gas passing through the low-pressure EGR control valve 52L changes, and hence the amount of exhaust gas introduced into the intake passage 30 by the low-pressure EGR device 50L changes. The low-pressure EGR control valve is electrically connected to the interface 85 of the electronic control unit 80. The electronic control unit 80 supplies the low-pressure EGR control valve with a control signal for operating the low-pressure EGR control valve 52L. The low-pressure EGR cooler 53L is arranged in the low-pressure EGR pipe 51L. The low-pressure EGR cooler 53L cools exhaust gas flowing through the low-pressure EGR pipe 51L.

In addition, as described above, the ideas about the changeover of the control of the boost pressure described in association with the first embodiment of the invention, the third embodiment of the invention, and the fifth embodiment of the invention, and the ideas about the setting of the initial value of the disturbance described in association with the second embodiment of the invention, the fourth embodiment of the invention, and the sixth embodiment of the invention can also be applied to the control of the boost pressure in the internal combustion engine shown in FIG. 20.

Besides, as described above, the ideas about the control of the EGR rate and the ideas about the setting of the initial value of the disturbance, which are described in association with the seventh to ninth embodiments of the invention, can be applied to the control of a low-pressure EGR rate (i.e., a ratio of an amount of exhaust gas introduced into the intake passage by the low-pressure EGR device to an amount of gas sucked into the combustion chambers) in the internal combustion engine shown in FIG. 20, and can be applied to the control of a high-pressure EGR rate (i.e., a ratio of an amount of exhaust gas introduced into the intake passage by the high-pressure EGR device to an amount of gas sucked into the combustion chambers) in the internal combustion engine shown in FIG. 20.

Judging from the matters described above, the idea about the changeover of the control of the boost pressure described in association with the first embodiment of the invention and the idea about the setting of the initial value of the disturbance described in association with the second embodiment of the invention can be said to be applicable to, in a broad sense, a control apparatus for an internal combustion engine including a control target that controls a controlled variable, and the control apparatus capable of selectively performing single control that is control for controlling the controlled variable to a target value thereof without considering a change in the controlled variable that acts as a disturbance on control of the controlled variable, and composite control that is control for controlling the controlled variable to the target value thereof in consideration of the change in the controlled variable that acts as the disturbance on the control of the controlled variable. Then, in this case, according to the idea about the changeover of the control of the boost pressure described in association with the first embodiment of the invention, the controlled variable is controlled to the target value thereof through the single control when the absolute value of a controlled variable change rate that is an amount of change in the controlled variable per unit time is equal to or smaller than a predetermined controlled variable change rate, and the controlled variable is controlled to the target value through the composite control when the absolute value of the controlled variable change rate is larger than the predetermined controlled variable change rate. Besides, in this case, according to the idea about the setting of the initial value of the disturbance described in association with the second embodiment of the invention, when the control of the controlled variable is changed over from the single control to the composite control, the composite control is started using, as an initial value of the disturbance in the composite control, the disturbance on the control of the controlled variable resulting from the change in the controlled variable at a time when the controlled variable has reached a stable equilibrium state through the control of the controlled variable by the composite control.

By the same token, the idea about the changeover of the control of the boost pressure described in association with the third embodiment of the invention and the idea about the setting of the initial value of the disturbance described in association with the fourth embodiment of the invention can be said to be applicable to, in a broad sense, a control apparatus for an internal combustion engine which includes control targets that control two different controlled variables respectively and in which, depending on a first controlled variable that is the controlled variable controlled by a first control target as one of the control targets, a second controlled variable that is the controlled variable controlled by a second control target as the other control target changes, and the control apparatus is capable of selectively performing single control that is control for controlling the second controlled variable to a target value thereof without considering a change in the first controlled variable that acts as a disturbance on control of the second controlled variable, and composite control that is control for controlling the second controlled variable to the target value thereof in consideration of the change in the first controlled variable that acts as the disturbance on the control of the second controlled variable. Then, in this case, according to the idea about the changeover of the control of the boost pressure described in association with the third embodiment of the invention, the second controlled variable is controlled to the target value thereof through the single control when the absolute value of a first controlled variable change rate that is an amount of change in the first controlled variable per unit time is equal to or smaller than a predetermined first controlled variable change rate, and the second controlled variable is controlled to the target value thereof through the composite control when the absolute value of the first controlled variable change rate is larger than the predetermined first controlled variable change rate. Besides, in this case, according to the idea about the setting of the initial value of the disturbance described in association with the fourth embodiment of the invention, when the control of the second controlled variable is changed over from the single control to the composite control, the composite control is started using, as an initial value of the disturbance in the composite control, the disturbance on the control of the second controlled variable resulting from the change in the first controlled variable at a time when the second controlled variable reached a stable equilibrium state through the control of the second controlled variable by the composite control.

By the same token, the idea about the changeover of the control of the boost pressure described in association with the fifth embodiment of the invention and the idea about the setting of the initial value of the disturbance described in association with the sixth embodiment of the invention can be said to be applicable to, in a broad sense, a control apparatus for an internal combustion engine which includes control targets that control two different controlled variables respectively and in which, depending on a first controlled variable that is the controlled variable controlled by a first control target as one of the control targets, a second controlled variable that is the controlled variable controlled by a second control target as the other control target changes, and the control apparatus is capable of selectively performing single control that is control for controlling the second controlled variable to a target value thereof without considering a change in the first controlled variable and a change in the second controlled variable that act as a disturbance on control of the second controlled variable, and composite control that is control for controlling the second controlled variable to the target value thereof in consideration of the change in the first controlled variable and the change in the second controlled variable that act as the disturbance on the control of the second controlled variable. Then, in this case, according to the idea about the changeover of the control of the boost pressure described in association with the fifth embodiment of the invention, the second controlled variable is controlled to the target value thereof through the single control when the absolute value of a first controlled variable change rate that is an amount of change in the first controlled variable per unit time is equal to or smaller than a predetermined first controlled variable change rate and the absolute value of a second controlled variable change rate that is an amount of change in the second controlled variable per unit time is equal to or smaller than a predetermined second controlled variable change rate, and the second controlled variable is controlled to the target value thereof through the composite control when the absolute value of the first controlled variable change rate is larger than the predetermined first controlled variable change rate or when the absolute value of the second controlled variable change rate is larger than the predetermined second controlled variable change rate. Besides, in this case, according to the idea about the setting of the initial value of the disturbance described in association with the sixth embodiment of the invention, when control of the second controlled variable is changed over from the single control to the composite control, the composite control is started using, as an initial value of the disturbance in the composite control, the disturbance on the control of the second controlled variable resulting from the change in the first controlled variable and the change in the second controlled variable at a time when the second controlled variable has reached a stable equilibrium state through the control of the second controlled variable by the composite control.

Next, an embodiment of the invention (hereinafter referred to as "the tenth embodiment of the invention") in the case where a controller that generates the aforementioned control signal through the use of a state equation that expresses the behavior of the boost pressure using the boost pressure deviation as an input variable instead of using the fuel injection amount change rate and the boost pressure change rate as input variables is adopted as the single controller according to the fifth embodiment of the invention and a controller that generates the aforementioned control signal through the use of a state equation that expresses the behavior of the boost pressure using the boost pressure deviation, the fuel injection amount change rate, and the boost pressure change rate as input variables is adopted as the composite controller according to the fifth embodiment of the invention will be described.

Incidentally, the configuration and control of the tenth embodiment of the invention that will not be described hereinafter are identical to the configurations and control of the aforementioned embodiments of the invention, or are a configuration and control that are derived as a matter of course from the configurations and control of the aforementioned embodiments of the invention in view of the configuration and control of the tenth embodiment of the invention that will be described hereinafter.

When the boost pressure is denoted by "x", the fuel injection amount is denoted by "w", and the vane opening degree is denoted by "u", a state equation as an expression 1 shown below is established. Incidentally, in the expression 1 shown below, "A", "$B_1$", and "$B_2$" are coefficient matrices. It should be noted herein that since the change in the fuel injection amount has almost no influence on the boost pressure, a state equation as an expression 2 shown below is established if the term of the fuel injection amount is deleted. Besides, when the boost pressure is denoted by "x", the target boost pressure is denoted by "r", and an integrator of a tracking error is denoted by "v", an expression 3 shown below is established. Besides, when the vane opening degree is denoted by "$u_{servo}$", the boost pressure is denoted by "x", and the integrator of the tracking error is denoted by "v", a control law can be designed as expressed by an expression 4 shown below. Incidentally, in the expression 4 shown below, "$K_x$" and "$K_v$" are coefficient matrices. In addition, the control designed to control the boost pressure adopting the vane opening degree $u_{servo}$ calculated through the use of the aforementioned expressions 2 to 4 as a target vane opening degree u is the aforementioned single control.

[Formula 1]

$$\dot{x}=Ax+B_1w+B_2u \tag{1}$$

$$\dot{x}=Ax+B_2u \tag{2}$$

$$\dot{v}=r-x \tag{3}$$

$$u_{ervo}=K_xx+K_vv \tag{4}$$

Besides, when the state of the controller is denoted by "$x_k$", the fuel injection amount is denoted by "w", the boost pressure is denoted by "x", and the vane opening degree is denoted by "$u_{dist}$", an expression 5 shown below and an expression 6 shown below are established. Incidentally, in the expression 5 shown below and the expression 6 shown below, "$A_k$", "$B_{k1}$", "$B_{k2}$", "$C_k$", "$D_{k1}$" and "$D_{k2}$" are coefficient matrices. In addition, the control designed to control the boost pressure adopting as the target vane opening degree u a value ($=u_{servo}+u_{dist}$) obtained by adding a vane opening degree $u_{dist}$ calculated through the use of the aforementioned expression 2, the aforementioned expression 5, and the aforementioned expression 6 to the vane opening degree $u_{servo}$ calculated through the use of the aforementioned expressions 2 to 4 is the aforementioned composite control.

[Formula 2]

$$\dot{x}=A_kx_k+B_{k1}w+B_{k2}x \tag{5}$$

$$u_{dist}=C_kx_k+D_{k1}w+D_{k2}x \tag{6}$$

Besides, if the idea of setting the initial value of the disturbance described in association with the sixth embodiment of the invention is applied to the setting of the initial value of the disturbance according to the seventh embodiment of the invention, a steady state in composite control is expressed by setting the derivative terms of the aforementioned expression 1, the aforementioned expression 3, and the aforementioned expression 5 to "0" as expressed by expressions 7 to 9 shown below. Besides, the target vane opening degree u in composite control is expressed by an expression 10 shown below.

[Formula 3]

$$Ax+B_1w+B_2u=0 \tag{7}$$

$$r-x=0 \tag{8}$$

$$A_kx_k+B_{k1}w+B_{k2}x=0 \tag{9}$$

$$u=u_{servo}+u_{dist}=K_xx+K_vv+C_kx_k+D_{k2}x \tag{10}$$

Accordingly, on the basis of the aforementioned expressions 7 to 10, as indicated by an expression 11 shown below, an initial value $x_{k\text{-}initial}$ of the disturbance on the control of the boost pressure in composite control at the time when the control of the boost pressure is changed over from single control to composite control is obtained.

[Formula 4]

$$u=u_{k\text{-}initial}=-(B_2C_k)^{554}[\{A+B_2(K_x+D_{k2})\}]r+(B_1+B_2D_{k1})w+B_2K_vv \tag{11}$$

Incidentally, the theory of designing target value tracking control described in association with the seventh embodiment of the invention is not limited to any specific theory. As this theory, it is possible to adopt, for example, theories of an optimal regulator, a pole placement method, sliding mode control, H∝ control, H2 control and the like.

Besides, the aforementioned embodiments of the invention are embodiments in the case where the invention is applied to the compression self-ignition type internal combustion engine. However, the invention can also be applied to a spark ignition type internal combustion engine (a so-called gasoline engine).

Besides, the idea about the disturbance that should be adopted as the initial value of the disturbance in composite control at the time when a changeover is made from single control to the composite control can also be applied to a case where a changeover is made between the performance of catalyst temperature control for controlling the temperature of a catalyst to a predetermined temperature and the stop thereof in an internal combustion engine that includes the catalyst, which is designed to purify characteristic components in exhaust gas discharged from combustion chambers to an exhaust passage, in the exhaust passage.

The invention claimed is:

1. A control apparatus for an internal combustion engine including control targets that control two different controlled variables respectively, wherein depending on a fuel injection amount that is the controlled variable controlled by a fuel injection valve as one of the control targets, a boost pressure that is the controlled variable controlled by a vane as the other control target changes, the control apparatus comprising:

a control unit configured to selectively perform single control that is control for controlling the boost pressure to a target value thereof without considering a change in the fuel injection amount that acts as a disturbance on control of the boost pressure, and composite control that is control for controlling the boost pressure to the target value thereof in consideration of the change in the fuel injection amount that acts as the disturbance on the control of the boost pressure, wherein the control unit is configured to control the boost pressure to the target value thereof through the single control when an absolute value of a fuel injection amount change rate that is an amount of change in the fuel injection amount per unit time is equal to or smaller than a predetermined fuel injection amount change rate, and controls the boost pressure to the target value thereof through the composite control when the absolute value of the fuel injection amount change rate is larger than the predetermined fuel injection amount change rate.

2. The control apparatus for the internal combustion engine according to claim 1, wherein when the control of the boost pressure is changed over from the single control to the composite control, the control unit is configured to start the composite control using, as an initial value of the disturbance in the composite control, the disturbance on the control of the boost pressure resulting from the change in the fuel injection amount at a time when the boost pressure reached a stable equilibrium state through the control of the boost pressure by the composite control.

3. A control apparatus for an internal combustion engine including control targets that control two different controlled variables respectively, wherein depending on a fuel injection amount that is the controlled variable controlled by a fuel injection valve as one of the control targets, a boost pressure that is the controlled variable controlled by a vane as the other control target changes, the control apparatus comprising:

a control unit configured to selectively perform single control that is control for controlling the boost pressure to a target value thereof without considering a change in the fuel injection amount and a change in the boost pressure that act as a disturbance on control of the boost pressure, and composite control that is control for controlling the boost pressure to the target value thereof in consideration of the change in the fuel injection amount and the change in the boost pressure that act as the disturbance on the control of the boost pressure, wherein the control unit is configured to control the boost pressure to the target value thereof through the single control when an absolute value of a fuel injection amount change rate that is an amount of change in the fuel injection amount per unit time is equal to or smaller than a predetermined fuel injection amount change rate and an absolute value of a boost pressure change rate that is an amount of change in the boost pressure per unit time is equal to or smaller than a predetermined boost pressure change rate, and controls the boost pressure to the target value thereof through the composite control when the absolute value of the fuel injection amount change rate is larger than the predetermined fuel injection amount change rate or when the absolute value of the boost pressure change rate is larger than the predetermined boost pressure change rate.

4. The control apparatus for the internal combustion engine according to claim 3, wherein when control of the boost pressure is changed over from the single control to the composite control, the control unit is configured to start the composite control using, as an initial value of the disturbance in the composite control, the disturbance on the control of the boost pressure resulting from the change in the fuel injection amount and the change in the boost pressure at a time when the boost pressure has reached a stable equilibrium state through the control of the boost pressure by the composite control.

5. The control apparatus for the internal combustion engine according to claim 3, wherein the control unit is configured to perform the single control with the use of a boost pressure deviation, without using the change in the fuel injection amount and the change in the boost pressure.

6. A control apparatus for an internal combustion engine including control targets that control two different controlled variables respectively, wherein depending on a fuel injection amount that is the controlled variable controlled by a fuel injection valve as one of the control targets, an exhaust gas recirculation (EGR) rate that is the controlled variable controlled by an EGR control valve as the other control target changes, the control apparatus comprising:

a control unit configured to selectively perform single control that is control for controlling the EGR rate to a target value thereof without considering a change in the fuel injection amount that acts as a disturbance on control of the EGR rate, and composite control that is control for controlling the EGR rate to the target value thereof in consideration of the change in the fuel injection amount that acts as the disturbance on the control of the EGR rate, wherein the control unit is configured to control the EGR rate to the target value thereof through the single control when an absolute value of a fuel injection amount change rate that is an amount of change in the fuel injection amount per unit time is equal to or smaller than a predetermined fuel injection amount change rate, and controls the EGR rate to the target value thereof through the composite control when the absolute value of the fuel injection amount change rate is larger than the predetermined fuel injection amount change rate.

7. The control apparatus for the internal combustion engine according to claim 6, wherein when the control of the EGR rate is changed over from the single control to the composite control, the control unit is configured to start the composite control using, as an initial value of the disturbance in the composite control, the disturbance on the control of the EGR rate resulting from the change in the fuel injection amount at a time when the EGR rate reached a stable equilibrium state through the control of the EGR rate by the composite control.

8. A control apparatus for an internal combustion engine including control targets that control two different controlled variables respectively, wherein depending on a fuel injection amount that is the controlled variable controlled by a fuel injection valve as one of the control targets, a exhaust gas recirculation (EGR) rate that is the controlled variable controlled by an EGR control valve as the other control target changes, the control apparatus comprising:

a control unit configured to selectively perform single control that is control for controlling the EGR rate to a target value thereof without considering a change in the fuel injection amount and a change in the EGR rate that act as a disturbance on control of the EGR rate, and composite control that is control for controlling the EGR rate to the target value thereof in consideration of the change in the fuel injection amount and the change in the EGR rate that act as the disturbance on the control of the EGR rate, wherein the control unit is configured to control the EGR rate to the target value thereof through the single control when an absolute value of a fuel injection amount change rate that is an amount of change in the fuel injection amount per unit time is equal to or smaller than a predetermined fuel injection amount change rate and an absolute value of a EGR rate change rate that is an amount of change in the EGR rate per unit time is equal to or smaller than a predetermined EGR rate change rate, and controls the EGR rate to the target value thereof through the composite control when the absolute value of the fuel injection amount change rate is larger than the predetermined fuel injection amount change rate or when the absolute value of the EGR rate change rate is larger than the predetermined EGR rate change rate.

9. The control apparatus for the internal combustion engine according to claim 8, wherein when control of the EGR rate is changed over from the single control to the composite control, the control unit is configured to start the composite control using, as an initial value of the disturbance in the composite control, the disturbance on the control of the EGR rate resulting from the change in the fuel injection amount and the change in the EGR rate at a time when the EGR rate has reached a stable equilibrium state through the control of the EGR rate by the composite control.

10. The control apparatus for the internal combustion engine according to claim 8, wherein the control unit is configured to perform the single control with the use of an EGR rate deviation, without using the change in the fuel injection amount and the change in the EGR rate.

* * * * *